(12) United States Patent
Mattsson et al.

(10) Patent No.: US 9,001,414 B2
(45) Date of Patent: Apr. 7, 2015

(54) CLADDING-PUMPED OPTICAL WAVEGUIDE

(75) Inventors: Kent Mattsson, Virum (DK); Kim Per Hansen, Lyngby (DK)

(73) Assignee: NKT Photonics A/S, Birkerod (DK)

(*) Notice: Subject to any disclaimer, the term of this patent is extended or adjusted under 35 U.S.C. 154(b) by 399 days.

(21) Appl. No.: 13/130,895

(22) PCT Filed: Nov. 30, 2009

(86) PCT No.: PCT/DK2009/050314
§ 371 (c)(1),
(2), (4) Date: May 24, 2011

(87) PCT Pub. No.: WO2010/060435
PCT Pub. Date: Jun. 3, 2010

(65) Prior Publication Data
US 2011/0228382 A1    Sep. 22, 2011

Related U.S. Application Data

(60) Provisional application No. 61/162,483, filed on Mar. 23, 2009, provisional application No. 61/118,542, filed on Nov. 28, 2008, provisional application No. 61/118,543, filed on Nov. 28, 2008.

(51) Int. Cl.
*H04B 10/17* (2006.01)
*H01S 3/067* (2006.01)
*H01S 3/094* (2006.01)
*H01S 3/23* (2006.01)

(52) U.S. Cl.
CPC ......... *H01S 3/06754* (2013.01); *H01S 3/06716* (2013.01); *H01S 3/06729* (2013.01); *H01S 3/094003* (2013.01); *H01S 3/094007* (2013.01); *H01S 3/094053* (2013.01); *H01S 3/09408* (2013.01); *H01S 3/2316* (2013.01)

(58) Field of Classification Search
USPC .............................. 359/341.3, 341.33; 372/6
See application file for complete search history.

(56) References Cited

U.S. PATENT DOCUMENTS 4,733,940 A * 3/1988 Broer et al. .................... 385/123
4,877,306 A   10/1989 Kar
(Continued)

FOREIGN PATENT DOCUMENTS

EP      1 648 055       4/2006
WO      WO 01/11736     2/2001
(Continued)

OTHER PUBLICATIONS

Nilson et al. "Yb3+-ring-doped fiber for high-energy pulse amplification", Optics Letters, vol. 22, pp. 1092-10-94 (1997).*
(Continued)

*Primary Examiner* — Eric Bolda
(74) *Attorney, Agent, or Firm* — Buchanan Ingersoll & Rooney PC

(57) ABSTRACT

The invention relates to a high power amplifier waveguide for amplifying an optical signal wherein photo darkening due to high optical flux is reduced considerably. This is achieved by providing a cladding pumped amplifier waveguide wherein the optical mode overlap to the active material of the waveguide is low and/or wherein the active material is distributed over a large cross sectional region of the waveguide.

15 Claims, 13 Drawing Sheets

(56) References Cited

U.S. PATENT DOCUMENTS

| | | | |
|---|---|---|---|
| 5,907,652 | A | 5/1999 | DiGiovanni et al. |
| 6,154,598 | A | 11/2000 | Gavrilovic et al. |
| 6,288,835 | B1 * | 9/2001 | Nilsson et al. ............. 359/341.3 |
| 6,363,194 | B1 * | 3/2002 | DiGiovanni et al. ......... 385/123 |
| 6,483,974 | B1 * | 11/2002 | Waarts .......................... 385/123 |
| 6,614,975 | B2 * | 9/2003 | Richardson et al. .......... 385/127 |
| 6,965,469 | B2 * | 11/2005 | Avizonis et al. ............ 359/341.1 |
| 7,116,875 | B2 | 10/2006 | Wadsworth et al. |
| 7,321,710 | B2 * | 1/2008 | Clarkson et al. .............. 385/123 |
| 2002/0030881 | A1 | 3/2002 | Nilsson et al. |
| 2002/0114602 | A1 | 8/2002 | Tardy et al. |
| 2002/0172482 | A1 | 11/2002 | Soufiane et al. |
| 2004/0095968 | A1 * | 5/2004 | Avizonis et al. .................. 372/6 |
| 2004/0213302 | A1 * | 10/2004 | Fermann et al. .................. 372/6 |
| 2005/0226580 | A1 * | 10/2005 | Samson et al. ................ 385/127 |
| 2006/0204188 | A1 * | 9/2006 | Clarkson et al. .............. 385/123 |

FOREIGN PATENT DOCUMENTS

| | | |
|---|---|---|
| WO | WO 03/019257 | 3/2003 |
| WO | WO 03/038486 | 5/2003 |
| WO | WO 2007/107164 | 9/2007 |

OTHER PUBLICATIONS

Atkins et al., "Reversible Photodarkening and Bleaching in $Tb^{3+}$-doped Optical Fibers" Optics Letters, 1994, vol. 19, No. 13, pp. 951-953.

Brocklesby et al., "Defect Production in Silica Fibers Doped with $Tm^{3+}$" Optics Letters, 1993, vol. 18, No. 24, pp. 2105-2107.

Nilsson et al., "Ring-Doped Cladding-Pumped Single-Mode Three-Level Fiber Laser" Optics Letters, 1998, vol. 23, No. 5, pp. 355-257.

Schmidt et al., "Single-Polarization Ultra-Large-Mode-Area Yb-Doped Photonic Crystal Fiber" Optics Express, 2008, vol. 16, No. 6, pp. 3918-3923.

International Search Report and the Written Opinion of the International Searching Authority (Forms PCT/ISA/210 and PCT/ISA/237) dated Feb. 22, 2010, issued in the corresponding International Application No. PCT/DK2009/050314.

* cited by examiner

CLADDING-PUMPED OPTICAL WAVEGUIDE

The invention relates to the field of high power light amplification in rare earth doped silica glass waveguides. The invention also relates to reduced signal photo darkening in rare earth doped high power amplifier silica glass amplifier waveguides.

High power optical fibre lasers are becoming of increasing interest as a consequence of their efficiency, low cost, and the availability of arrays of high power diode pump lasers. Such arrays of diode pump lasers can have an output power of several hundred watts or greater, and serve as ideal pump sources for optical fibre lasers.

The function of the optical fibre is to convert the highly multi-mode output from a diode array to a high power single mode output of a power amplifier or laser. The fibre converts the multimode high power low brightness diode array to a high brightness single mode source. There are many situations in which the beam quality of a single mode fibre with less power is more desirable than a higher powered multi-mode array. These applications include materials processing (cutting, welding, and marking) and surgery.

Diode bar arrays are commercially available, and can be arranged to produce many hundreds of watts output power. The power is delivered through multi-mode fibres, or arrays of fibres bundled together. However, a fibre having a low numerical aperture will not efficiently accept the radiation of these devices in such a manner that single mode laser radiation will result, as would occur by having the pump radiation from the diode array serve as the energy source to create an inversion in a rare earth doped optical fibre laser. Since single mode operation is desired for high brightness, with a core typically 5-30 µm in diameter, it is not possible to focus the light from the fibre output of the diode array into the single mode core. The brightness theorem specifies that the numerical aperture of the fibres coming from the diode sources, times the fibre area, must be a constant. Thus, the high intensity light from the fibre output of the diode array cannot be focused into the core of a single mode fibre. To circumvent this problem the double clad fibre construction may be applied. In such fibres, a high numerical aperture outer cladding is constructed to accept the pump power whereas the active core (e.g. an ytterbium doped core) with a low numerical aperture is placed in the inner core of the double clad fibre. Hereby the multimode diode low brightness light is effectively brought in overlap with the ytterbium doped core material in which high power single mode light is generated through stimulated emission inside a laser cavity consisting of two fibre gratings constructed either directly in the ytterbium doped fibre or in a separately fibre spliced to the active fibre such as an ytterbium doped fibre.

In the context of the present invention, the phrases "active material" and "active core" are used interchangeably with the phrases "rare earth doped material" and "rare earth doped core", respectively. Several rare earth materials can be used to make a fibre core active, such as Ytterbium and Erbium. In the context of the present invention, the phrase "active material" refers to a material, such as silica glass, which is doped with an active element, such as the Rare earth element Ytterbium.

In embodiments of the optical waveguide according to the present invention wherein the rare earth doping substantially is arranged in the inner cladding, the phrases "rare earth co-doped silica regions" and "inner cladding features comprising rare earth co-doped silica regions" are used interchangeably.

Due to the relative small diameter of the amplifier waveguide core, the optical flux, i.e. the optical lasing power transmitted per unit area of the fibre core, is extremely high. Consequently, absorption effects at gratings or inside the core can result in unwanted degradation of the device within a time frame which is substantially shorter than the lifetime required for the respective application of such lasers. It has been observed experimentally that with constant pump power, the lasing output decreased by several percent during a 1000 hour time period. It has further been observed experimentally that a considerable increase in propagation loss is experienced in un-seeded amplifiers after only a few hours of operation.

Due to the high pump power and signal power intensities (optical fluxes), a material that is suitable for relatively low optical fluxes will darken at a relatively high rate as the flux increases. The photo darkening of ytterbium and other rare earth doped silica materials has been attributed to the formation of colour centres in the glass material. The exact factor responsible for the increased absorption has not been identified but the effect is observed when irradiating the glass material with high energy photons (such as UV-, x- or y-rays) or with radiation that is resonant with the absorption bands of the rare earth material comprised in the glass.

In connection with Thulium co-doped silicate fibres it has been observed by Brocklesby et al. (Optics Letters, Vol. 18, No. 24, (1993)) that the fibre material photo darkens when irradiated with (476 nm) radiation resonant with the Thulium absorption band. This photo darkened material can partly be recovered by irradiating with non-resonant radiation at 514 nm or when heating the fibre at temperatures >350° C. For Terbium co-doped silicate fibres, 488 nm resonant radiation is by Atkins et al. (Optics Letters, Vol. 19, No. 13, (1994)) observed to photo darken the fibre material, whereas bleaching can be performed with non resonant radiation at the 514 nm laser line of an argon ion laser.

For ytterbium co-doped silicate fibres Gavrilovic et al. (U.S. Pat. No. 6,154,598) claims that photo darkening is due to unintentionally incorporated impurities disposed in the lasing medium which up-convert a portion of the lasing radiation to radiation of a shorter wavelength, thereby introducing defects in the medium, which result in increased absorption due to photo darkening.

Whatever the factor responsible for the increased absorption is, it is observable after irradiating the glass material with high intensity radiation. Photo darkening of Yb-doped silica fibres has been attributed to the formation of colour centres in the rare-earth doped glass, but the mechanism behind this phenomenon is not understood. As a result, it is difficult to predict how a particular fibre glass material will perform under a given set of operating conditions and further difficult to choose a proper glass material composition for such fibres.

In US 2002/0030881 is described a fiber laser wherein the active material is arranged in a ring surrounding the core region in order to reduce the interaction between the guided signal light and the active material.

It is an object of the invention to provide an optical fibre structure, wherein the lasing or amplifier output power level is maintained substantially constant over an extended operating period by less than 15% increase of the pump power for 10.000 hours operation or more.

As the photo darkening performance of a given material is a function of pump power and signal power intensities (optical fluxes), it is in the present invention realised that reduced signal to rare earth co-doped material overlap (herein referred to as the guided signal overlap) will lead to reduced effective photo darkening for the signal light. It is therefore an object of the invention to reduce the effective photo darkening in the waveguide laser and amplifier material to the output signal by choosing the fibre design with a reduced guided signal overlap, such as with 25% or less signal field to amplifier material overlap. When the overlap between guided signal and gain material is 25% or less, the overall signal and pump load on the gain material is reduced. This again reduces the overall photo darkening degradation to signal field due to a reduced optical flux on the colour centres that forms in the rare earth doped glass over prolonged time of operation of the device.

A waveguide laser or amplifier fibre design according to the present invention may comprise a silica glass host material doped with one or more rare earth elements in concentrations adapted to the intended level of amplification, pump wavelength, amplifying wavelength, intended length of fibre, etc. Advantageously the rare earth doped material surrounds a signal core glass material intended for guidance of the bulk part of the power generated. In one embodiment of the invention, the inner core glass material comprises, germanium co-doped material suitable for Bragg grating formation. The inner core glass material may comprise aluminium or phosphorous co-doped glass material.

The rare earth doped material may be distributed over two or more regions, of which one acts as a waveguide core (having a high effective refractive index), and the second acts as a pedestal cladding. The pedestal cladding has an effective refractive index with a value between that of a core and of a second cladding.

Because of these features, the present invention can be used in practical equipments for applications such as materials processing (cutting, welding, and marking) and surgery.

In this application the term "effective refractive index" is used to describe the refractive index of both homogenous materials and to describe the effective refractive index of complex or non-homogeneous materials, such as microstructured materials, holey materials, porous materials, nano-structured materials, meta-materials etc. The refractive index is the conventional refractive index of a homogeneous material. In some embodiments of the present invention, the waveguide is adapted for guiding optical wavelengths are in the visible to near-infrared regime (wavelengths from approximately 400 nm to 2 µm). In this wavelength range, several materials for fibre production (e.g. silica) may be considered mainly wavelength independent, or at least not strongly wavelength dependent. However, for complex or non-homogeneous materials, the effective refractive index may be very dependent on the morphology of the material. Furthermore, the effective refractive index of such a fibre may be strongly wavelength dependent. The procedure of determining the effective refractive index at a given wavelength of a given fibre structure with a complex material is well-known to those skilled in the art, as well as the art of computing advanced optical properties of such optical fibres (see e.g. Jouannopoulos et al, "Photonic Crystals", Princeton University Press, 1995; or Bjarklev, Broeng, and Bjarklev in "Photonic crystal fibres", Kluwer Academic Press, 2003). The simple term "index" may also be used in short without directly stating "refractive" or "effective refractive"—it should be understood that the term "index" in this context is meant to be equal to "refractive index" or "effective refractive index". The term "absolute" may also be used to underline the refractive index of the material itself. It should be clear that the absolute and effective refractive index may be similar in the case of uniform materials—or they may be different in the case of a complex or non-homogenous material.

Some objects of the invention are achieved by the invention described in the accompanying claims and as described in the following.

One object of the invention is achieved by a cladding pumped amplifier waveguide for amplifying an optical signal, the waveguide comprising a signal core adapted to guide an optical signal, said signal core having an effective refractive index $n_{core-1}$; an inner cladding region for guiding pump light, said inner cladding region comprising a first inner cladding having an effective refractive index $n_{inner-clad-1}$, wherein said first inner cladding is doped with at least one rare earth element; where $n_{core-1} > f_{inner-clad-1}$ and where the area of said signal core is larger than 25 µm$^2$, and/or said signal core comprises at least one core feature, and/or said inner cladding region comprises a plurality of inner cladding features The waveguide may comprise an outer cladding region surrounding said inner cladding region, said outer cladding region comprising at least a first outer cladding having an effective refractive index $n_{outer-clad-1}$.

The waveguide may also comprise a second inner cladding surrounding said first inner cladding, said second inner cladding having an effective refractive index $n_{inner-clad-2}$.

One object of the invention is achieved by a cladding pumped amplifier waveguide for amplifying an optical signal, the waveguide comprising a signal core adapted to guide an optical signal, said signal core having an effective refractive index $n_{core-1}$; an inner cladding region for guiding pump light, said inner cladding region comprising a first inner cladding having an effective refractive index $n_{inner-clad-1}$ and a second inner cladding having a refractive index $n_{inner-clad-2}$ and surrounding said first inner cladding; wherein at least said first inner cladding is doped with at least one rare earth element; and a first outer cladding having an effective refractive index $n_{outer-clad-1}$; where $n_{core-1} > n_{inner-clad-1} > n_{outer-clad-1}$.

One object of the invention is achieved by a high power amplifier waveguide comprising a core region containing at least one sub-region with increased refractive index relative to two or more cladding regions, and wherein at least one of said core and cladding regions contains an optically active gain media, and wherein said region is adapted to guide a light signal of wavelength $\lambda_{signal}$, and wherein said guided signal overlap is 25% or less.

One object of the invention is achieved in a cladding pumped amplifier waveguide for amplifying an optical signal, said waveguide comprising a signal core arranged to guide said optical signal, said signal core having an effective refractive index $n_{core}$; an inner cladding region for guiding pump light, said inner cladding region surrounding said signal core and having a refractive index $n_{inner-clad}$; a first outer cladding having an effective refractive index $n_{outer-clad}$; wherein $n_{core} > n_{inner-clad} > n_{outer-clad}$, and wherein said amplifier waveguide is improved by having the highest concentration of said active rare earth elements in said inner cladding region resulting in that photodarkening induced degradation of the amplifier efficiency is mitigated.

One object of the invention is achieved by a high power amplifier waveguide system for amplifying an optical signal comprising: a diode bar array pump laser which operates at a wavelength $\lambda_{pump}$ and with a pump power exceeding 100 W; a coupling device; a cladding pumped amplifier waveguide according to the present invention; an output delivery fibre; where the wavelength $\lambda_{pump}$ is resonant with an absorption band of said rare earth doping.

One object of the invention is achieved by a fibre laser or amplifier comprising an optical waveguide according to the present invention.

The refractive indices of the waveguide may be such that $n_{outer-clad-1} < n_{inner-clad-2}$. The effective refractive indices of the first and second inner claddings may be different, such as $n_{inner-clad-1} < n_{inner-clad-2}$ or $n_{inner-clad-1} > n_{inner-clad-2}$, or they may be substantially equal, i.e. $n_{inner-clad-1} \approx n_{inner-clad-2}$, such as having a relative difference which is less than 0.5%, such as less than 0.2%, such as less than 0.1%, such as less than 0.05%, such as less than 0.01%.

The effective refractive indices of the signal core and the second inner cladding may be such that, $n_{core-1} < n_{inner-clad-2}$, or such that $n_{core-1} > n_{inner-clad-2}$, or they may be substantially equal to each other, i.e. $n_{core-1} n_{inner-clad-2}$, such as having a relative difference which is less than 0.5%, such as less than 0.2%, such as less than 0.1%, such as less than 0.05%, such as less than 0.01%.

The signal core may comprise a silica material of a composition so that $n_{core-1}$ is substantially equal to the refractive index of pure silica, and the refractive index of said first inner cladding, $n_{inner-clad-1}$, may be below that of pure silica.

In one embodiment, the waveguide is adapted to guide an optical signal at a signal wavelength, $\lambda_{signal}$. This signal wavelength may be within the interval from 970 nm to 1250 nm, such as within the interval 1020 nm to 1120 nm, such as within the interval 1050 nm to 1090 nm In one embodiment, the signal core is adapted to guide an optical signal at a wavelength, $\lambda_{signal}$, of 1064 nm in a single mode condition.

In one embodiment, the first inner cladding comprises at least one rare earth doped silica region. This region may comprise an annular shaped region surrounding said signal core.

The first inner cladding may comprise a plurality of inner cladding features comprising rare earth doped silica regions. At least a part of these inner cladding features may be surrounded by down-doped silica regions, such as F-doped silica regions, such as said inner cladding features being individually surrounded by down-doped silica regions, and the effective refractive index of the first inner cladding, $n_{inner-clad-1}$, may be given by the average refractive index of said inner cladding features and said down-doped silica regions, i.e. $n_{inner-clad-1}$ may be given by the average refractive index of rare earth doped silica regions and F-doped silica regions in the inner cladding region.

In one embodiment, said inner cladding features have a cross sectional dimension of less than about 500 nm, such as about less than 400 nm, such as about less than 300 nm, such as about less than 250 nm, such as about less than 150 nm, such as about less than 100 nm, such as about less than 50 nm, such as about less than 25 nm, and the number of said inner cladding features may be more than about 100, such as more than about 200, such as more than about 350, such as more than about 500, such as more than about 750, such as more than about 1000, such as more than about 2000, such as more than about 3500, such as more than about 5000, such as more than about 7500, such as more than about 10000. The number of said inner cladding features may be less than about 100000.

In one embodiment, said inner cladding features have a cross sectional dimension of more than about 500 nm, such as about more than 600 nm, such as about more than 700 nm, such as about more than 850 nm, such as about more than 1000 nm, such as about more than 1500 nm, such as about more than 2500 nm, such as about more than 5000 nm, and the number of said inner cladding features may be less than about 50, such as less than about 25, such as less than about 15, such as less than about 10, such as less than about 8, such as less than about 6, such as less than about 5, such as less than about 4, such as less than about 3, such as less than about 2, such as less than about 1. Said inner cladding features may have a cross sectional dimension of less than about 20000 nm.

The cross sectional dimensions of the different regions and regions of the waveguide may be such that the largest cross sectional dimension of the individual rare earth doped silica regions is less than said optical signal wavelength $\lambda_{signal}$ divided by 2, such as less than $\lambda_{signal}$ divided by 5, such as less than $\lambda_{signal}$ divided by 10.

The down-doped silica regions may comprise an index lowering element selected from the group of Fluorine (F), Boron (B), or combinations thereof.

The second inner cladding may be doped with at least one rare earth element. In one embodiment, the level of rare earth element doping is higher in said first inner cladding than in said second inner cladding.

The refractive indices of the signal core and the first inner cladding may be such that the difference $n_{core-1} - n_{inner-clad-1}$ is larger than $1 \cdot 10^{-5}$, such as larger than $1 \cdot 10^{-4}$, such as larger than $2 \cdot 10^{-4}$, such as larger than $5 \cdot 10^{-4}$, such as larger than $1 \cdot 10^{-3}$.

The refractive indices of the first and second inner claddings may be such that the difference $n_{inner-clad-1} - n_{inner-clad-2}$ is less than $-1 \cdot 10^{-4}$, such as less than $-2 \cdot 10^{-4}$ or such that the difference $n_{inner-clad-1} - n_{inner-clad-2}$ is less than $1 \cdot 10^{-3}$, such as less than $5 \cdot 10^{-4}$, as less than $2 \cdot 10^{-4}$, as less than $1 \cdot 10^{-4}$, as less than $1 \cdot 10^{-5}$.

The refractive indices of the first inner cladding and the first outer cladding may be such that $n_{inner-clad-1} - n_{outer-clad-1}$ is less than $1 \cdot 10^{-3}$, such as less than $5 \cdot 10^{-4}$, as less than $2 \cdot 10^{-4}$, as less than $1 \cdot 10^{-4}$, as less than $1 \cdot 10^{-5}$, as less than $-1 \cdot 10^{-4}$, as less than $-2 \cdot 10^{-4}$.

In a preferred embodiment, the signal core and the first inner cladding hold equal centre of mass and the border between the two regions is substantially circular in cross section. The border may also be substantially hexagonal in cross section.

The waveguide may be adapted to carry optical signals with a large effective mode area, such as the effective mode area of said optical signal is larger than about 50 μm², such as larger than about 80 μm², such as larger than about 100 μm², such as larger than about 150 μm², such as larger than about 200 μm², such as larger than about 250 μm², such as larger than about 350 μm², such as larger than about 450 μm², such as larger than about 600 μm², such as larger than about 800 μm², such as larger than about 1000 μm².

The area of said effective mode area of said optical signal may be smaller than about 100000 μm², such as smaller than about 40000 μm², such as smaller than about 20000 μm², such as smaller than about 10000 μm², such as smaller than about 7500 μm², such as smaller than about 5000 μm², such as smaller than 2500 μm², such as smaller than 2000 μm².

In one embodiment, the waveguide comprises a signal core with a relatively large signal core area. The area of the signal core may be larger than about 10 μm², such as larger than about 25 μm², such as larger than about 50 μm², such as larger than about 80 μm², such as larger than about 100 μm², such as larger than about 125 μm², such as larger than about 150 μm², such as larger than about 200 μm², such as larger than about 250 μm², such as larger than about 300 μm², such as larger than about 400 μm², such as larger than about 500 μm², such as larger than about 700 μm², such as larger than about 1000 μm².

The signal core area may be in the range from about 25 μm² to about 50000 μm², such as in the range from about 50 μm² to about 50000 μm², in the range from about 75 μm² to about 50000 μm², in the range from about 80 μm² to about 50000 μm², in the range from about 100 μm² to about 50000 μm², in the range from about 300 μm² to about 50000 μm², in the range from about 500 μm² to about 50000 μm², in the range from about 1000 μm² to about 50000 μm².

The area of said signal core may be smaller than about 100000 μm², such as smaller than about 40000 μm², such as smaller than about 20000 µm², such as smaller than about 10000 µm², such as smaller than about 7500 µm², such as smaller than about 5000 µm², such as smaller than 2500 µm², such as smaller than 2000 µm².

The area of said first inner cladding may be larger than about 10 µm², such as larger than about 50 µm², such as larger than about 100 µm², such as larger than about 150 µm², such as larger than about 200 µm², such as larger than about 300 µm², such as larger than about 350 µm², such as larger than about 400 µm², such as larger than about 500 µm², such as larger than about 600 µm², such as larger than about 750 µm², such as larger than about 1000 µm², such as larger than about 2000 µm².

The area of said first inner cladding may be smaller than about 200000 µm², such as smaller than about 100000 µm², such as smaller than about 50000 µm², such as smaller than about 25000 µm², such as smaller than about 10000 µm², such as smaller than about 5000 µm², such as smaller than 2500 µm², such as smaller than about 2000 µm².

In one embodiment, the amplifier waveguide according to this invention is adapted to have a ratio between the area of the first inner cladding and the area of the signal core in the range of about 4 to about 500, such as about 5 to 500, such as about 6 to 500, such as about 8 to 500, such as about 10 to 500, such as about 15 to 500, such as about 20 to 500, such as about 25 to 500, such as about 50 to 500, such as about 100 to 500, such as about 150 to 500, such as about 200 to 500, such as about 300 to 500, such as about 400 to 500. The ratio between the area of the first inner cladding and the area of the signal core may be in the range of about 4 to about 500, such as about 4 to 400, such as about 4 to 300, such as about 4 to 200, such as about 4 to 100, such as about 4 to 50, such as about 4 to 25, such as about 4 to 20, such as about 4 to 10.

The ratio between the area of the first inner cladding and the area of the signal core may be about 4, such as about 4.5, such as about 5, such as about 6, such as about 8, such as about 10, such as about 15, such as about 20, such as about 25, such as about 50, such as about 100, such as about 200, such as about 300, such as about 400, such as about 500.

In a preferred embodiment, the amplifier waveguide according to the present the overlap of said optical signal guided in said signal core to said rare earth doped silica region(s) (the guided signal overlap) is about 25%, or less, such about 20% or less, such as about 15% or less, such as about 10% or less, such as about 5% or less, such as in the range of about 2% to about 25%.

In one embodiment, the mode field intensity of said optical signal at the border between the signal core and the inner cladding region is in the range of about 0.5% to 5%, such as in the range of about 1% to 4%, such as in the range of about 1% to 3%, such as in the range of about 1% to 2%.

In one embodiment, the mode field intensity of said optical signal in the inner cladding region is in the range of about 0.5% to 5%, such as in the range of about 1% to 4%, such as in the range of about 1% to 3%, such as in the range of about 1% to 2%.

The overlap of said optical signal guided in said signal core to said rare earth doped silica region(s) in the inner cladding region may be reduced by adding a spacer region surrounding said signal core, said spacer region being surrounded by said inner cladding, whereby the intensity of an optical signal guided in said signal core in said first inner cladding region is reduced.

In one embodiment, where said inner cladding comprises at least one active material, the inner cladding may be arranged such that it is substantially contactly surrounding said signal core.

In one embodiment, where said inner cladding comprises at least one active material, the inner cladding may be arranged such that the radial distance between the inner cladding and the signal core is less than about 5 µm, such as less than about 4.5 µm, such as less than about 4 µm, such as less than about 3.5 µm, such as less than about 3 µm, such as less than about 2.5 µm, such as less than about 2 µm, such as less than about 1.5 µm, such as less than about 1 µm, such as less than about 0.5 µm, such as less than about 0.4 µm, such as less than about 0.3 µm, such as less than about 0.2 µm, such as less than about 0.1 µm.

In one embodiment, the signal core of the amplifier waveguide according to the present invention comprises a signal core background material, wherein said core feature(s) having a refractive index profile different from the refractive index of said signal core background material.

In one embodiment, the first inner cladding of the amplifier waveguide according to the present invention comprises a first inner cladding background material, wherein said plurality of inner cladding features comprises first inner cladding features arranged in said first inner cladding, said first inner cladding features having a refractive index profile different from the refractive index of the said first inner cladding background material.

In one embodiment, the second inner cladding comprises a second inner cladding background material, and wherein said plurality of inner cladding features comprises second inner cladding features arranged in said second inner cladding, said second inner cladding features having a refractive index profile different from the refractive index of said second inner cladding background material.

The inner cladding features may comprise regions with a refractive index below that of the first and/or second inner cladding background material, such as voids or down-doped silica.

The inner cladding features may be arranged in a lattice, such as a hexagonal lattice, a square lattice, or a honey comb lattice.

In a core comprising a plurality of core features, said core features may be arranged in a lattice, such as a hexagonal lattice, a square lattice, or a honey comb lattice.

In a waveguide comprising a plurality of inner cladding features, the signal core may be defined by replacing at least one of said inner cladding features with at least one core feature comprising a core material of a refractive index profile different from the refractive index profile of said first inner cladding features.

The signal core may also be formed by replacing 1 of said inner cladding features and the 6 nearest inner cladding features with core features, such as replacing 1 of said inner cladding features and the 18 nearest inner cladding features with core features, such as replacing one of said inner cladding features and more than 18 of the nearest inner cladding features. In a hexagonal lattice, a core where 1, 7, or 19 inner cladding features has been replaced with core features, may comprise a central core feature, surrounded by 0, 1, or 2 rings of core features, respectively. The rings need not to be completed and a core comprising one 1 core feature in connection to for instance 3 more core features may also be realized. As such, there is a large degree of freedom when deciding on the number of core elements and their relative arrangement. The core features do not necessarily have to comprise identical refractive index profiles. In one embodiment, the central core feature has a higher refractive index than the surrounding core features in the fully or partially filled rings.

In one embodiment, the first inner cladding features comprise a rare earth doped material, or at least a part of said inner cladding features comprise a rare earth doped material. The first inner cladding features comprising a rare earth doped material may be arranged to form at least one chain surrounding said signal core. In one embodiment, the first inner cladding features comprise rare earth doped silica tubes.

In one embodiment, at least a part of said first inner cladding background material comprises rare earth doped silica.

The Photonic bandgap effect can be utilized to guide light in the signal core. In one such embodiment, the first inner cladding features comprises a material with an effective refractive index above that of said first inner cladding background material. The material of the first inner cladding features, their size and distribution is such that a Photonic Bandgap is formed enabling guidance of the optical signal in the signal core by the Photonic Bandgap effect.

In one embodiment, the second inner cladding features comprises a material with an effective refractive index above that of said second inner cladding background material. The material of the second inner cladding features, their size and distribution is such that a Photonic Bandgap is formed enabling guidance of the optical signal in the signal core by the Photonic Bandgap effect.

In one embodiment, the first and/or the second inner cladding features comprises a material with an effective refractive index below that of said second inner cladding background material. The material of the first and/or the second inner cladding features, their size and distribution is such that, whereby a Photonic Bandgap is formed enabling guidance of the optical signal in the signal core by the Photonic Bandgap effect.

The rare earth element may also be present in the core. In one embodiment, the signal core and the first inner cladding region comprises a uniform distribution of rare earth elements In one embodiment, the coupling to phonons co-propagating in the waveguide is reduced by having an inner core region comprising a high phonon velocity material, wherein phonons have a higher velocity than in pure silica glasses. The high phonon velocity material may comprise Aluminium co-doped silica glass. This will result in anti-guidance of phonons whereby the effect of Raman amplification may be reduced significantly.

In one embodiment, the first inner cladding features and optionally the second inner cladding features are arranged so that the waveguide can be operated as an anti-resonant reflecting optical waveguide. The signal core may then be surrounded on opposite sides by first inner cladding features, said first inner cladding features being surrounded by second inner cladding features arranged on opposite sides of said signal core.

In one embodiment, the first inner cladding region comprises a ring of first inner cladding features, said inner cladding features comprising a low index region surrounded by a rare earth doped region. The low index material may comprise a void.

In one embodiment, the first outer cladding comprises an air cladding. This air cladding may have a large Numerical aperture suitable for collecting and guiding intense pump signals in the inner cladding.

The outer cladding may also comprise a polymer coating.

The rare earth element may be selected from the group of Ytterbium (Yb), Erbium (Er), Praseodymium (Pr), Neodynium (Nd), Holmium (Ho), Thulium (Tm), Dysprosium (Dy), or combinations thereof, while the rare earth doped silica material may be co-doped with Aluminum (Al), Phosphorous (P), Cesium (Cs) or combinations thereof. The concentration of said rare earth element in said rare earth doped silica material may be in the range of about $1\times10^{19}$ cm$^{-3}$ to about $5\times10^{21}$ cm$^{-3}$.

One object of the invention is achieved by a high power amplifier waveguide comprising a waveguide with signal core of area $A_{signal}$ surrounded by a first inner cladding of area $A_{inner-clad-1}$, a first inner cladding of area $A_{inner-clad-2}$, and an outer cladding, where said signal core refractive index is higher than the refractive index of said first and second inner cladding, and where part of the inner cladding comprises at least one rare earth element, and where the guided signal wavelength is $\lambda_{signal}$, and where said guided signal overlap to said rare earth co-doped region(s) is 25% or less.

It is an object of the invention to provide a cladding-pumped optical fibre structure, wherein, for a given rare-earth doping level, pump light absorption is maximized in a lasing or amplifier configuration.

One object of the invention is to provide cladding-pumped optical fibre structure with high pump absorption and core size as small as possible in order to mitigate bending sensitivity and facilitate splicing.

It is further an object of the invention to provide a cladding-pumped optical fibre structure, wherein, for a given waveguiding core size and pump light absorption, the rare earth concentration is minimized to enable a system in which lasing or amplifier output power level is maintained substantially constant over an extended operating period. Minimizing the rare earth concentration is advantageous with respect to photo degradation, or photo darkening in amplifier or laser systems as it is the concentration is linked to the degradation rate and saturated attenuation level.

One waveguide laser or amplifier fibre design according to the present invention comprises a silica glass host material doped with one or more rare earth elements in concentrations adapted to the intended level of amplification, pump wavelength, amplifying wavelength, intended length of fibre, etc. The rare earth doped material may be distributed over two or more regions, of which at least one of them has an effective refractive index comparable to a cladding material. The rare earth doped material may be distributed over two or more regions, of which one acts as a waveguide core (having a high effective refractive index), and the second acts as a pedestal cladding. The pedestal cladding has an effective refractive index with a value between that of a core and that of a second cladding. The rare earth doped region may surround a signal core glass material intended for guidance of the majority of the signal light. In one object of the invention, the signal core glass material comprises a photosensitive material, such as germanium co-doped material, suitable for Bragg grating formation, said signal core being surrounded by an region of rare earth doped glass with an index higher than the cladding index.

The 'guided signal overlap' is the fraction of the optical mode power that propagates in the rare earth co-doped silica glass region(s) relative to the total mode power. In embodiments of the optical waveguides according to the present invention, wherein the active material is confined to the inner cladding region, the term 'guided signal overlap' to said rare earth co-doped silica glass region(s) is taken to mean the scalar signal electrical field E(x, y) intensity overlap to the first inner cladding as given by the confinement factor $\Gamma_{inner-clad-1}$ of equation 1:

$$\Gamma_{inner-clad-1} = \frac{\iint_{A_{inner-clad-1}} |E(x,y)|^2 dx dy}{\int_{-\infty}^{\infty}\int_{-\infty}^{\infty} |E(x,y)|^2 dx dy} \quad (1)$$

The scalar signal electrical field E(x, y) is determined from the scalar differential equation 2:

$$\left(\frac{\partial^2}{\partial x^2} + \frac{\partial^2}{\partial y^2} + k^2 n^2(x, y) - \beta^2\right) E(x, y) = 0 \quad (2)$$

where $k=\omega/c$ is the free space wave coefficient, n(x,y) is the refractive index at cross sectional position (x,y), and $\beta=\beta_{mn}=2\pi/\lambda^{signal} \cdot n_{eff}$ is the longitudinal propagation coefficient for mode mn, and $n_{eff,\,mn}$ is the effective refractive index for mode mn. In the calculation of the 'guided signal overlap' only the degenerate fundamental mode is considered as the optical feedback from Bragg gratings is only present for this mode inside the laser cavity. The boundary conditions for the solution to equation (2) is defined as E(x,y)=0 at a distance 1 μm into the second cladding.

In one embodiment, the signal core comprises at least one photosensitive region, comprising a photosensitive element, such as Ge-doped silica region. Each of said at least one photosensitive regions may be surrounded by a down-doped silica region, where the effective refractive index of said signal core is given by the average refractive index of said at least one photosensitive region and said down-doped silica regions.

In one embodiment, said signal core comprises a plurality of photosensitive regions each of which each may be surrounded by a down-doped silica region, the effective refractive index of said signal core is given by the average refractive index of said plurality of photosensitive regions and said down-doped silica regions.

The largest cross sectional dimension of one photosensitive region may in one embodiment be less than 0.5 micrometer, such as less than 0.2 micrometer, such as less than 0.1 micrometer.

In one embodiment, said signal core is adapted to guide light at a signal wavelength $\lambda_{signal}$, said signal core comprising at least one photosensitive region, comprising a photosensitive element, such as Ge-doped silica region, surrounded by at least one down-doped silica region, where said effective refractive index of said signal core is given by the average refractive index of said at least one photosensitive region and said down-doped silica regions and where the largest cross sectional dimension of one photosensitive region is less than said signal wavelength $\lambda_{signal}$ divided by 2, such as less than $\lambda_{signal}$ divided by 5, such as less than $\lambda_{signal}$ divided by 10.

In one embodiment of the system according to the present invention, a first fibre Bragg grating is formed between said coupling device and said cladding pumped amplifier waveguide, and wherein a second fibre Bragg grating is formed between said cladding pumped amplifier waveguide and said output delivery fibre. The first and second fibre Bragg grating may be formed by fusion splicing sections of fibre comprising Bragg gratings to the amplifier waveguide. The Bragg gratings may be written directly into said amplifier waveguide In one embodiment, the guided signal overlap to the first inner cladding is determined and simultaneously the ability to form Bragg gratings in said signal core is made possible by a photosensitive region comprising a Ge co-doped cross sectional segmented region in the signal core. The signal core comprises a plurality of Ge co-doped silica regions. These Ge co-doped silica regions may be surrounded by fluorine co-doped silica glass, whereby said refractive index of said signal core is given by the average refractive index of said Ge co-doped silica regions and said fluorine co-doped silica glass regions. In one embodiment, the largest dimension across said individual Ge co-doped silica regions is less than said signal wavelength $\lambda_{signal}$ divided by 2, such as less than $\lambda_{signal}$ divided by 5, such as less than $\lambda_{signal}$ divided by 10. In one embodiment, the largest dimension across said individual Ge co-doped silica regions is less than 0.5 micrometer, such as less than 0.2 micrometer, such as less than 0.1 micrometer.

In one embodiment, the guided signal overlap to the first inner cladding is determined and simultaneously the ability to form Bragg gratings in said signal core is made possible by a photosensitive region in said signal core.

The photosensitive region may comprise at least one photosensitive element. The photosensitive element may be selected from the group of Germanium (Ge), Boron (B), or combinations thereof The pump light absorption of the amplifier waveguide can advantageously be defined independent of the optical mode power overlap to the first inner cladding by a rare earth co-doped 'cross sectional segmented' region. The first inner cladding may comprise a plurality of rare earth co-doped silica regions surrounded by fluorine co-doped silica glass where said refractive index of said signal core is given by the average refractive index of said rare earth co-doped silica regions and said fluorine co-doped silica glass regions and where the largest dimension across said individual rare earth co-doped silica regions is less than said signal wavelength $\lambda_{signal}$ divided by 2, such as less than $\lambda_{signal}$ divided by 5, such as less than $\lambda_{signal}$ divided by 10. The pump light absorption becomes hereby a function of the rare earth region times the rare earth atomic concentration times the absorption cross section of the rare earth atom.

A low signal to active material overlap may be maintained when the first inner cladding average refractive index subtracted second inner cladding the average refractive index is less than $1 \cdot 10^{-3}$, such as less than $5 \cdot 10^{-4}$, such as less than $2 \cdot 10^{-4}$, such as less than $1 \cdot 10^{-4}$, such as less than $1 \cdot 10^{-5}$, such as less than $-1 \cdot 10^{-4}$, such as less than $-2 \cdot 10^{-4}$. This sets a limitation to the actual achievable pump absorption defined by the region of the outer core region.

In an embodiment of the invention, it is further possible to optimize the amplification of the glass material (in the 976 nm-1250 nm band) by pumping ytterbium doped glass with radiation resonant with the ytterbium absorption band (880 nm-976 nm).

To extend the threshold for the nonlinear effect of Raman scattering the effective mode area can advantageously be larger than 50 μm². The term 'effective mode area' is in the present context defined by equation 3:

$$A_{eff} = \frac{\left(\int_{-\infty}^{\infty}\int_{-\infty}^{\infty} |E(x, y)|^2 \, dx\,dy\right)^2}{\int_{-\infty}^{\infty}\int_{-\infty}^{\infty} |E(x, y)|^4 \, dx\,dy} \quad (3)$$

The effective mode area $A_{eff}=\pi\, W_{eff}^2$, where $w_{eff}$ is the mode radius. The 'mode field diameter' is two times the mode radius $w_{eff}$. Relating the effective mode area to the mode field diameter is frequently utilized in optical fibers. The relation is valid only for close to Gaussian modes in ordinary axially symmetrical fibers. In the present context the Gaussian approximation is applied such that when quoting a mode field diameter it is taken to mean the mode field diameter of the Gaussian equivalent mode with the effective area defined above. The mode field diameter is found where the electric and magnetic field strengths are reduced to 1/e of their maximum values, i.e., the diameter at which power is reduced to $1/e^2$ of the maximum power, because the power is proportional to the square of the field strength. A large effective mode area or large mode field diameter is desirable because the threshold for unwanted stimulated Raman scattering is proportional with the effective mode area.

In an embodiment of the invention the signal core and the first inner cladding hold equal centre of mass and the border between the two is substantial circular in cross section. This embodiment may be used for modified chemical deposition derived preform material directly drawn to form the signal core.

In an embodiment of the invention the signal core and the first inner cladding hold equal centre of mass and the border between the two regions is substantially hexagonal in cross section. This embodiment may be used in relation to modified chemical deposition derived preform material applied in a stack and draw process for forming a 'cross sectional segmented' signal core.

The signal to active material overlap may be 20% or less, such as 15% or less, such as 10% or less, such as 5% or less.

The first inner cladding area may be larger than 10 $\mu m^2$, such as larger than 50 $\mu m^2$, such as larger than 100 $\mu m^2$, such as larger than 150 $\mu m^2$, such as larger than 200 $\mu m^2$, such as larger than 300 $\mu m^2$.

One object an object of the invention is achieved by a high power amplifier comprising a diode bar array pump laser which operates at a wavelength $\lambda_{pump}$ and with a pump power exceeding 100 W, a coupling device, a high power amplifier waveguide according to the invention, and an output delivery fibre. The term 'the wavelength $\lambda_{pump}$ is resonant with the rare earth doping absorption band' is in the present context taken to mean that $\lambda_{pump}$ is within the absorption band of the rare earth dopant element(s).

To achieve high pump efficiency, the fiber may be configured to comprise a signal core having a diameter $d_{core}=2 (A_{in}/\pi)^{0.5}>3.6$ $\mu m$ and a numerical aperture less than 0.1, a first inner cladding diameter $d_{outer}=2 (A_{out}/\pi)^{0.5}>5$ $\mu m$ surrounded by a second inner cladding having a diameter >30 $\mu m$ and a numerical aperture larger than or equal to 0.4, surrounded by an outer cladding comprising either polymeric material or an air/glass microstructure, and wherein the coupling device is a fused fibre bundle tapered to fit in numerical aperture to the numerical aperture of the second inner cladding and the fibre bundle fibres are attached to diode bar array lasers.

To achieve laser operation of the amplifier waveguide, the high power amplifier can be configured such that between the coupling device and the fibre a first fibre Bragg grating is formed, and wherein between the fibre and the output delivery fibre a second fibre Bragg grating is formed. These gratings can be either formed by fusion splicing a section of fibre wherein the fibre Bragg grating is formed to the respective fibre ends of the silica host glass fibre or be written directly into the core of the fibre. The latter option requires an additional co-doping of the core with germanium or another photosensitive element.

One object of the invention is achieved by a high power amplifier waveguide comprising a signal core region containing at least one sub-region with increased refractive index relative to the inner and outer claddings, and wherein at least one of said core and cladding regions contains an optically active gain media, and wherein at least one of said core and cladding regions comprises a waveguide adapted to guide a light signal of wavelength $\lambda_{signal}$, and wherein said signal to said gain media overlap is 25% or less.

There may be several effects involved in reducing the effect of photodarkening in a waveguide amplifier according to the present invention. In waveguides with a large optical signal to rare earth element overlap, absorption of pump and signal light at color centers in the vicinity of the Yb atoms in the Silica matrix causes the temperature of the silica material to increase, whereby the cross sectional characteristics for the absorption and emission processes relating to the presence of Yb in the waveguide are changed. With the design of the waveguide disclosed in this application, the temperature change occurring as a response to the absorption of pump and signal is mitigated so that the temperature is substantially maintained during operation, which will result in a more reliable and constant slope efficiency.

In one embodiment, the waveguide comprises stress inducing elements arranged at opposite sides relative to said signal core, whereby the waveguide suppress one polarization of the light propagating through the waveguide, whereby the fiber becomes polarization maintaining and/or polarizing.

One object of the present invention is to provide a cladding pumped amplifier waveguide for amplifying an optical signal, said cladding pumped amplifier waveguide comprising a signal core, an inner cladding region, and a first outer cladding region. The signal core is adapted to guide an optical signal, said signal core having an effective refractive index $n_{core-1}$; wherein said signal core is doped with at least one rare earth element. in an average concentration of $c_{RE,signal-core}$ The inner cladding region for guiding pump light, said inner cladding region comprising a first inner cladding having an effective refractive index $n_{inner-clad-1}$ and a second inner cladding having an effective refractive index $n_{inner-clad-2}$ and surrounding said first inner cladding; wherein at least said first inner cladding is doped with at least one rare earth element in an average concentration of $c_{RE,inner-clad}$. The first outer cladding having an effective refractive index $n_{outer-clad}$, where $n_{core-1}>n_{inner-clad}>n_{outer-clad}$.

In one embodiment, the effective refractive index of the signal core and the effective refractive index of the inner cladding region differs. The difference between these two effective refractive indices, $n_{core-1}-n_{inner-clad}$, may be larger than about $1\cdot10^{-3}$, such as larger than about $5\cdot10^{-4}$, such as larger than about $2\cdot10^{-4}$, such as larger than about $1\cdot10^{-4}$, such as larger than about $1\cdot10^{-5}$.

In one embodiment, the effective refractive index of the inner cladding and the effective refractive index of the outer cladding region differs. The difference between these two effective refractive indices, $n_{inner-clad-1}-n_{outer-clad}$, may be less than about $1\cdot10^{-3}$, such as less than about $5\cdot10^{-4}$, such as less than about $2\cdot10^{-4}$, such as less than about $1\cdot10^{-4}$, such as less than about $1\cdot10^{-5}$, such as less than about $-1\cdot10^{-4}$, such as less than about $-2\cdot10^{-4}$ The signal core and the first inner cladding may be arranged in different manners relative to each other. In one embodiment, said signal core and said first inner cladding hold equal centre of mass and the border between the two regions is substantially circular in cross section. In one embodiment, the signal core and said first inner cladding hold equal centre of mass and the border between the two regions is substantially hexagonal in cross section. A hexagonal arrangement may be obtained when the waveguide is fabricated using the stack-and-draw technique One object of the present application is provided by a high power amplifier waveguide system for amplifying an optical signal, said system comprising a diode bar array pump laser, a coupling device, a cladding pumped amplifier waveguide according to the present invention, an output delivery fibre. The diode bar array pump laser operates at a wavelength $\lambda_{pump}$ and with a pump power exceeding about 100 W; where the wavelength $\lambda_{pump}$ is resonant with an absorption band of said rare earth doping. A first fibre Bragg grating may be formed between said coupling device and said cladding pumped amplifier waveguide, and a second fibre Bragg grating may be formed between said cladding pumped amplifier waveguide and said output delivery fibre. The first and second fibre Bragg grating may be formed by fusion splicing sections of fibre comprising Bragg gratings to the amplifier waveguide.

The cladding pumped amplifier waveguide of the system may additionally be co-doped with germanium in said signal core and said first and second Bragg gratings may be written directly into said signal core.

One object of the present invention is provided by a cladding pumped amplifier waveguide for amplifying an optical signal, said waveguide comprising a signal core, an inner cladding for guiding pump light, and a first outer cladding. The signal core is arranged to guide said optical signal, said signal core having an effective refractive index $n_{core}$. The inner cladding region surrounding said signal core and having an effective refractive index $n_{inner-clad}$. The first outer cladding having an effective refractive index $n_{outer-clad}$. The refractive indices of the regions are such that $n_{core} > n_{inner-clad} > n_{outer-clad}$, and wherein said amplifier waveguide is improved by having the highest concentration of said active rare earth elements in said inner cladding region resulting in that photodarkening induced degradation of the amplifier efficiency is mitigated.

One object of the present invention is to provide a method for producing a cladding pumped amplifier waveguide as described herein, said method comprising arranging at least one signal core precursor elements and a plurality of inner cladding precursor elements in stack, wherein said inner cladding precursor elements are arranged in a chain surrounding said core precursor element.

One object of the present invention is to provide a method for fabricating a cladding pumped amplifier waveguide as described herein, said comprising arranging precursor elements in a perform and drawing said perform into an amplifier waveguide The precursor elements may comprise a plurality of inner cladding precursor elements arranged to provide inner cladding features in the drawn amplifier waveguide. In one embodiment, at least a part of said inner cladding precursor elements comprises at least one region doped with an active element, such as a Rare Earth element.

In one embodiment, at least a part of said active element doped regions of the precursor elements are individually surrounded by down-doped region.

In one embodiment, the inner cladding precursor elements are arranged in a chain surrounding said core precursor element.

In one embodiment, the number of regions doped with an active element per inner cladding precursor elements is more than about 10, such as more than about 25, such as more than about 50, such as more than about 100, such as more than about 125, such as more than about 150, such as more than about 300, such as more than about 500, such as more than about 1000, such as more than about 1500, such as more than about 2000.

In one embodiment, the number of said inner cladding features is less than about 20, such as less than about 15, such as less than about 12, such as less than about 10, such as less than about 8, such as less than about 6, such as less than about 4, such as less than about 3, such as less than about 2.

In general, the inner cladding should be disposed such that it does not contain any regions of extent in the cross sectional plane sufficient to act as a secondary core, i.e., to support a propagating optical signal. This condition may be met if the inner cladding (and in particular the inner cladding features) does not contain any region with a refractive index much higher than that of the surrounding inner cladding basis material. More generally, the inner cladding features should be distributed (in the waveguide cross section) and have an effective refractive index such that there is no inner cladding region with (cross sectional) dimensions equal to or larger than the core region that has effective refractive index larger than $(n_{core-1} + n_{inner-clad})/2$.

The present invention can be applied to both solid fiber and to fibers with microstructured features in the core and/or the cladding. For example, the index profiles of the various examples may be representative for microstructured fibers (this includes fibers referred to as photonic crystal fibers, phtonic bandgap fibers, leaky channel fibers, porous fibers, hole-assisted fibers, etc.).

In one embodiment, $c_{RE,signal-core}$ is substantially identical to $c_{RE,inner-clad}$. In one embodiment $c_{RE,signal-core}$ is smaller than $c_{RE,inner-clad}$, such as $c_{RE,signal-core} < 0.9 * c_{RE,inner-clad}$, such as $c_{RE,signal-core} < 0.8 * c_{RE,inner-clad}$, such as $c_{RE,signal-core} < 0.7 * c_{RE,inner-clad}$, such as $c_{RE,signal-core} < 0.6 * c_{RE,inner-clad}$, such as $c_{RE,signal-core} < 0.5 * c_{RE,inner-clad}$, such as $c_{RE,signal-core} < 0.4 * c_{RE,inner-clad}$, such as $c_{RE,signal-core} < 0.3 * c_{RE,inner-clad}$, such as $c_{RE,signal-core} < 0.2 * c_{RE,inner-clad}$, such as $c_{RE,signal-core} < 0.1 * c_{RE,inner-clad}$ The silica glass host fibre may be a double clad fibre or a micro-structured double clad fibre, such as an air-clad fibre. This has the advantage of providing a fibre that is suitable for high-power applications. In the present context, the term an 'air-clad' fibre is taken to mean a micro-structured fibre wherein light to be propagated is confined to a part of the fibre within a circumferential distribution of longitudinally extending voids in the cladding of the fibre, cf. e.g. U.S. Pat. No. 5,907,652 or WO-03/019257. An example of such a fibre (without the doped cladding modifications of the present invention) is a DC-225-22-Yb fibre from Crystal Fibre A/S (Birkeroed, Denmark).

It is to be understood that the following detailed description is merely exemplary of the invention, and is intended to provide an overview or framework for under-standing the nature and character of the invention as it is claimed. The accompanying figures are included to provide further understanding of the invention, and are incorporated in and constitute a part of the invention. The invention is not limited to the described examples. The figures illustrate various features and embodiments of the invention and together with the description serve to explain the principles and operation of the invention.

The invention will be explained more fully below in connection with a preferred embodiment and with reference to the drawings in which.

Figure 13:
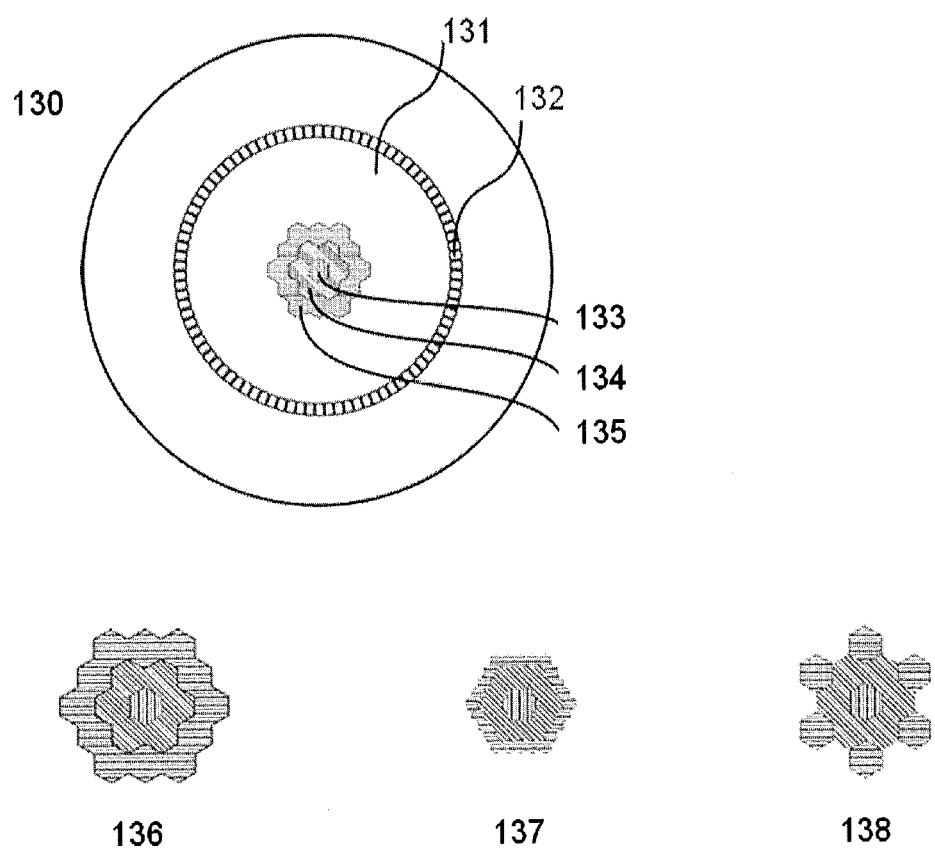
Figure 14:
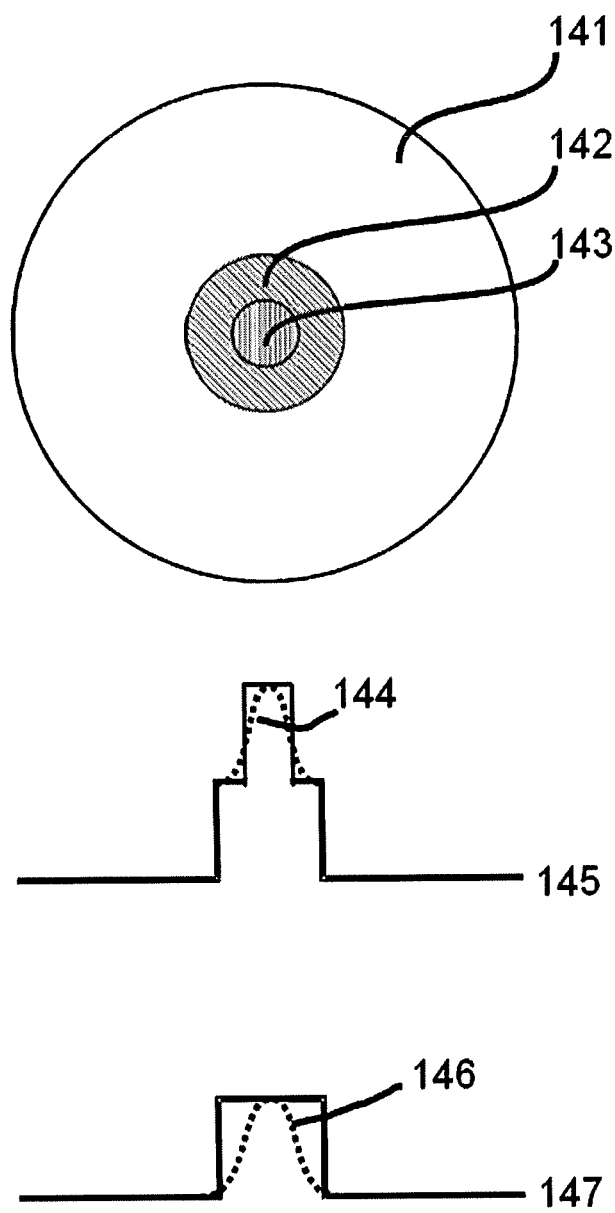

FIG. 13 shows a cross sectional view of a silica glass host fiber with a cross sectional segmented signal core and an air-clad pump core; and examples of possible cross sectional segmented core FIG. 14 shows a cross sectional view of a fiber comprising a RE-doped signal core, a RE-doped first inner cladding and second inner cladding, and an example of an index profile and a RE doping profile for a fiber, where the index of the doped first inner cladding is raised compared to the to the first inner cladding for a so-called pedestal design;

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications Within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

In the following, the design and application of a high power amplifier according to the invention will be discussed in connection with a number of examples.

In one embodiment, the silica glass host fibre is a double clad fibre such as a micro-structured fibre, such as an air-clad fibre. This type of fibre is suitable for high-power applications. In the present context, the term an 'air-clad' fibre is taken to mean a micro-structured fibre wherein light to be propagated is confined to a part of the fibre within a circumferential distribution of longitudinally extending voids in the cladding of the fibre, cf. e.g. U.S. Pat. No. 5,907,652 or WO-03/019257. An example of such a fibre (without the signal overlap modifications of the present invention) is a DC-225-22-Yb fibre from Crystal Fibre A/S (Birkeroed, Denmark).

Aspects of the cross sectional segmented regions as well as their manufacture are described in U.S. Pat. No. 7,116,875.

Aspects of rare-earth doped silica fibre lasers are described in a variety of sources, e.g. in [Digonnet], chapter 3, pp. 113-170.

Aspects of writing of Bragg gratings in optical fibres and hydrogen/deuterium loading in silica optical fibres are discussed in various text books in connection with photosensitivity enhancements prior or during the writing of Bragg gratings in optical fibres, cf. e.g. A. Othonos & K. Kalli in 'Fibre Bragg Gratings', Artech House, 1999, chapter 2.6.1, pp. 43-48.

Figure 1:
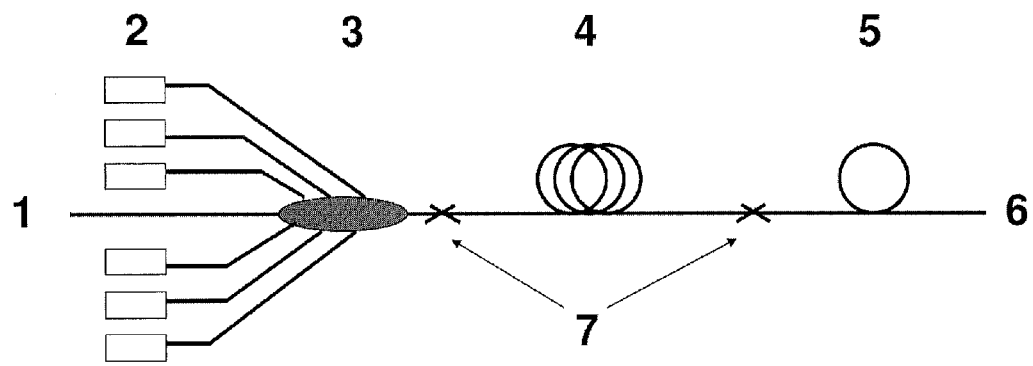
FIG. 1 shows a diagram of the high power amplifier according to the present invention.

FIG. 1 shows a schematic diagram of a high power amplifier waveguide according to the present invention. The input signal 1 is amplified through the high power amplifier 4 comprising a DC fiber and delivered as output 6 from the output delivery fibre 5. The pump radiation from diode bar arrays 2 is coupled into said double cladding fibre 4 through a section of fused and tapered fibre bundle 3. The fiber bundle is tapered in a manner so that the bundle output numerical aperture matches the numerical aperture of the inner cladding of the double cladding fibre 4. The signal 1 is coupled into the signal core of the double cladding fibre 4 by the same tapered fibre bundle 3. The output signal is delivered by output fibre 5 to the output 6 in a substantially single mode core. The coupling device or fused and tapered fibre bundle 3 is spliced (preferably fusion spliced)—as indicated with—to the double cladding fibre 4 as is the output delivery fibre 5.

Figure 2:
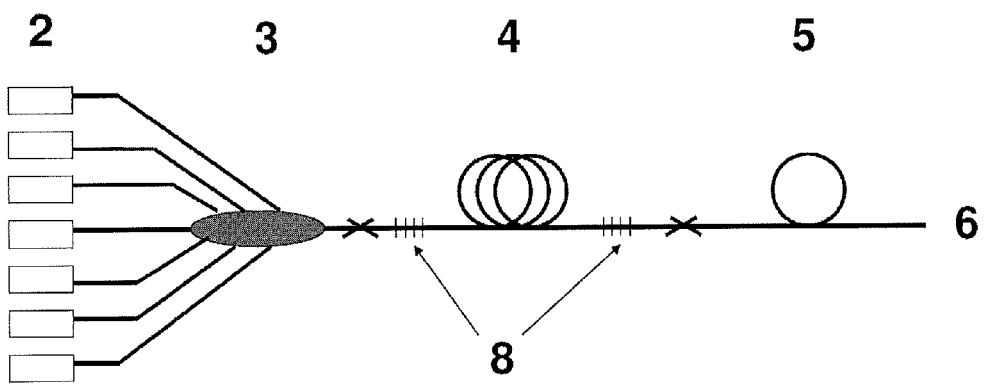
FIG. 2 shows a diagram of the high power amplifier according to the present invention in a laser configuration.

FIG. 2 shows a schematic diagram of a high power amplifier according to the present invention in a laser configuration. FIG. 2 is identical to FIG. 1, except that the input signal port (1, in FIG. 1) is replaced with a pump diode fibre receiving pump light from diode bar arrays 2. In FIG. 2, the single mode input fibre 1 of FIG. 1 of the coupling device 3 (here a fused and tapered fibre bundle) has been substituted by a multimode input fibre carrying pump light. The laser action is achieved through adding gratings 8 in or next to (i.e. optically coupled to) the amplifier fibre 4.

EXAMPLE 1

This example discloses how the photo darkening of a high power amplifier silica glass host material doped with rare earth atoms such as ytterbium is reduced by reducing the signal to amplifier material overlap. This example compares the photo darkening behaviour of a "pedestal" step index high power amplifier fiber with a high power amplifier waveguide according to the present invention. The two fibres are identical with respect to mode field diameter, pump absorption and optical gain media composition.

The "pedestal" step index fiber comprises a 38.4 $\mu m^2$ Ge co-doped signal core, a 230.4 $\mu m^2$ Yb co-doped first inner cladding region surrounded by an index raised second inner cladding surrounded by an outer cladding comprising an air cladding. The Yb co-doped gain media comprises 0.12 at % ytterbium and 1.0 at % aluminium co-doped silica and the overlap to the gain media region is 68.1%. The overlap to the Ge co-doped inner core region is 26.6%.

The high power amplifier waveguide of this example comprises a 268.8 μm² Ge co-doped inner core region, and an outer region comprising 230.4 μm² Yb co-doped silica index matched to the cladding by intermixing with 96.8 μm² fluorine co-doped silica into a cross sectional segmented, a first silica cladding surrounded by an outer second air cladding. The overlap to the outer core region is 11.0%. The dilution of the ytterbium co-doped material in fluoride co-doped silica leads to an overlap to the rare earth co-doped material of 7.8%. Both fibres show 18 μm mode field diameters and 0.8 dB/m pump absorption at 915 nm in 248 μm air-cladding.

Figure 3:
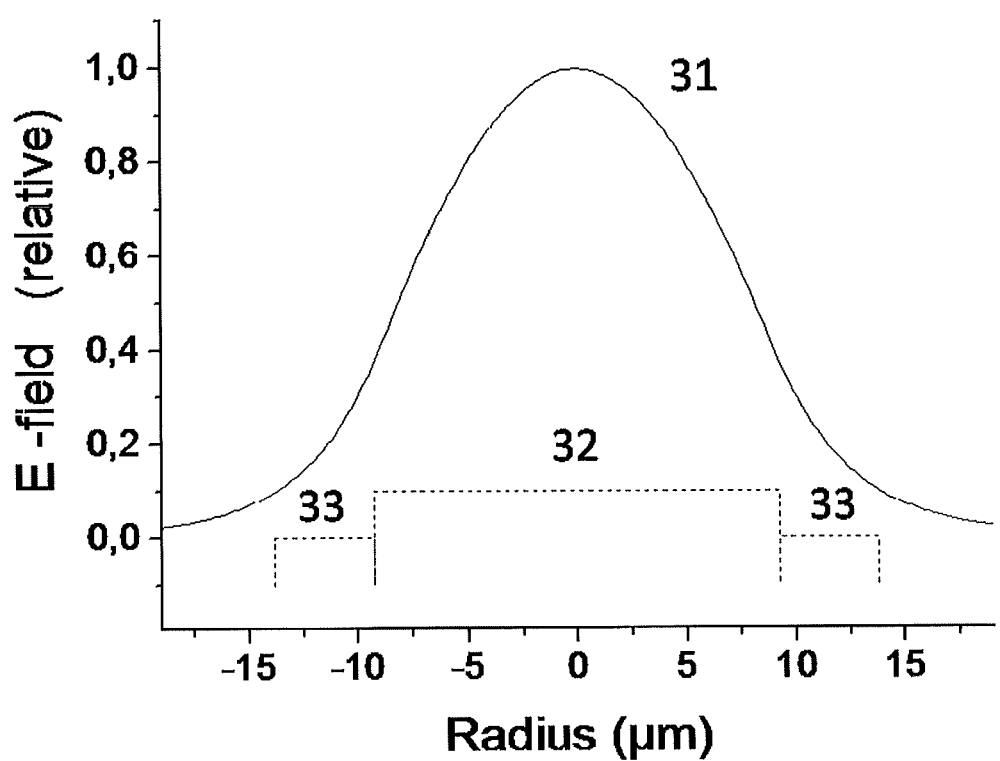
FIG. 3 shows the scalar electrical field as function of radial position relative to the core centre axis of an amplifier waveguide according to the present invention.

In FIG. 3 the calculated E-field distribution 31 is shown as function of the radial position relative to the core centre axis for the amplifier waveguide according to the present invention. Along with the E-field distribution the Ge co-doped region 32 and cross sectional segmented Yb co-doped region (n-Yb) 33 is indicated with the dashed line. It is in FIG. 3 to be observed that the E-field is about 1/10 of its maximum value at the edges that are taken to be at the edges of the outer core region.

Figure 4:
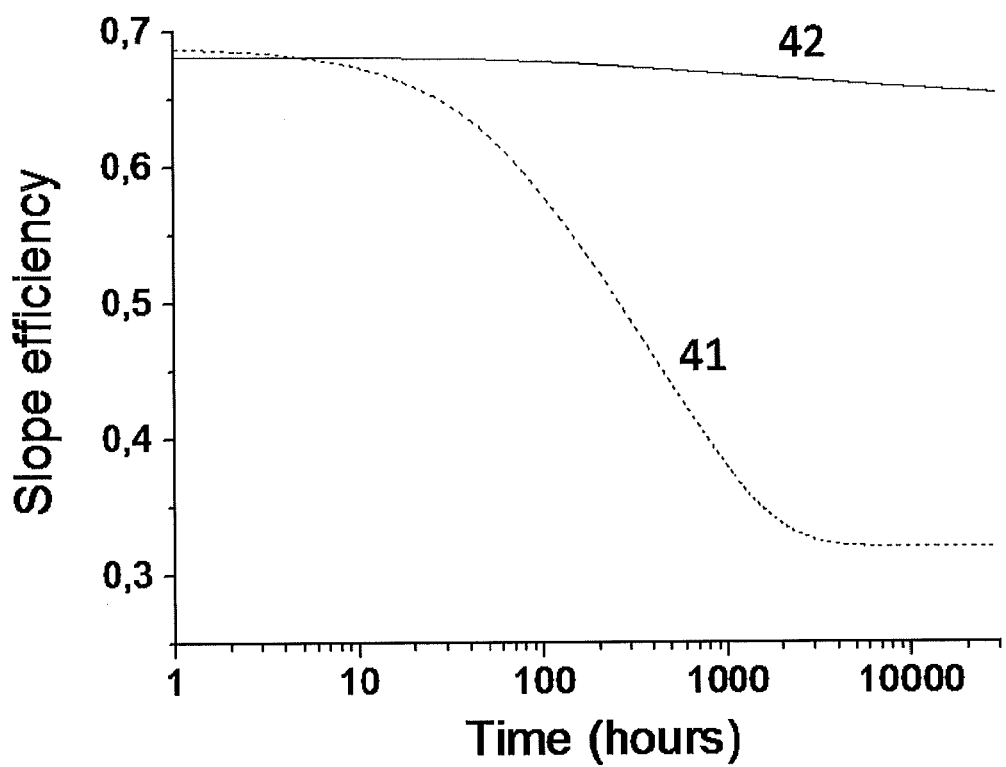
FIG. 4 shows slope efficiency of high power lasers as function of time, where the lower curve represents an amplifier configuration with an ordinary signal to active material overlap and the upper curve represents an amplifier with decreased signal to active material overlap according to the present invention.

The photo darkening of fibre samples are performed in a 350 W constant output laser system with $\lambda_{signal}$=1064 nm. The development in slope efficiency as function of time is shown in FIG. 4 for 10.000 hours operation. The slope efficiency is here the single mode output power delivered in a passive single mode delivery fibre divided by the pump power launched into a 61:1 pump combiner. The system is pumped at $\lambda_{pump}$=915 nm. The pump power is increased as function of time in accordance with the observed degradation of the output signal which is maintained at 350 W. Both systems has a 4 m master oscillator cavity length, a 28% output coupler reflectivity and >99.95% high reflector reflectivity when operating at $\lambda_{signal}$=1064 nm. The power amplifier section length is 12.25 m yielding MOPA system pump absorption of 13 dB.

In FIG. 4 the evolution of the slope efficiency as function of time is shown for the two fibres. The lower curve 41 shows the output from the pedestal fibre and the upper curve 42 shows the output from the amplifier waveguide in accordance with the present invention. It can be observed that the slope efficiency of the lower curve 41 drops considerably and saturates at 32% slope efficiency after 20000 hours operation whereas the upper curve 42 maintains the slope efficiency above 65% for 30.000 hours operation. The reduced signal to gain media overlap can be observed to improve the MOPA device slope efficiency considerably. The performance of the pedestal fibre can be improved by reducing the local ytterbium concentration. This will hold significance for the achievable pump absorption which again holds importance for the device length that again lowers the threshold for unwanted stimulated Raman scattering events.

EXAMPLE 2

In this example the amplifier waveguide of this invention is designed with an V-number below 2.405—i.e. only allowing single mode propagation in straight sections of the fibre. The V-number is known as the Normalized frequency parameter and is given by $V=2\pi NA \, a/\lambda_{Signal}$. Here NA is the numerical aperture, a the fiber core radius.

The fibre design for the amplifier waveguide of example 1 show V=2.86 and it operates therefore with multiple modes. Coiling this fibre (to a coiling diameter of 16 cm or less) will bring it into effectively single mode operation as the higher order modes is stripped off due to macro-bend induced coupling losses for the higher order modes.

In this example a single mode operational design is described. The advantages of such an approach is that unwanted scattering events along the length of the produced fibre—such as Rayleigh scattering—will not lead to degradation of the amount of light that can be coupled into a single mode delivery fiber. For fibre designs that show higher order mode propagation the part of the field that is scattered into higher order modes will gain energy from the gain media despite the mode is experiencing scattering loss due to bend induced losses. As a result part of the gain is dissipated into higher order modes during their scattering.

The requirement for the design shown in example 1 is that the Ge co-doped core radius is to be reduced in area from 268.8 μm² to 179.2 μm² or less to achieve a V number below 2.405. This will reduce the mode field diameter of the guided field to 16.6 μm which due to stimulated Raman scattering will reduce the maximum output power attainable for the fibre design. For the 330 W output power of example 1 it is however still sufficient.

Figure 5:
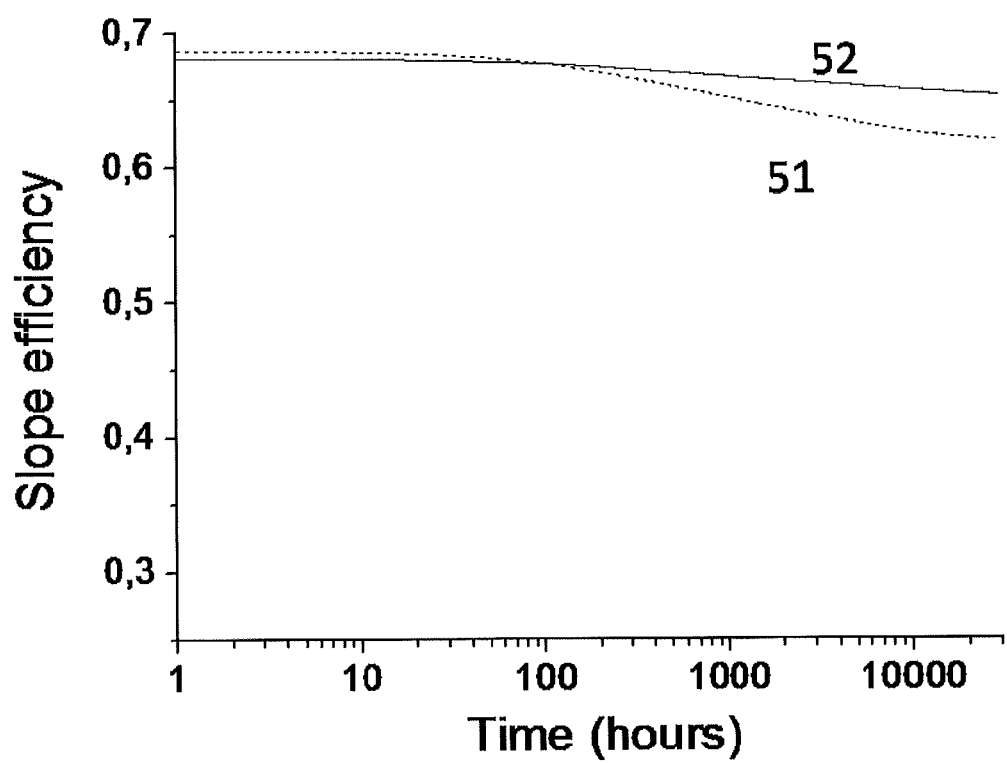
FIG. 5 shows slope efficiency of high power single mode lasers as function of time, where the lower curve represents an amplifier configuration with an amplifier with decreased signal to active material overlap according to the present invention and the upper curve represents an amplifier with extra decreased signal to active material overlap according to the present invention.

The change in Ge co-doped core radius changes the overlap integrals for the Ge co-doped material to 82.8% as well as for the cross sectional segmented Yb co-doped material to 11.8%. This again influences the long term stability of the material as shown in FIG. 5 wherein it is found that the slope efficiency saturates at about 62% for the dashed curve 51 compared to the curve 52 for the fiber designed according to example 1.

One approach in achieving single mode operation with a larger mode field diameter and maintaining the low signal to gain media overlap would be to introduce a distance between the gain media and the Ge co-doped part of the core. This can be done by stacking the Ge co-doped material inside a glass tube which again is surrounded in the stacking with gain media material rods of nano-structured or directly deposited gain material. To achieve identical signal to gain media overlap as obtained in Example 1 a silica ring of 1.27 μm thickness is to be introduced between the Ge co-doped region and the gain media region. The result of this yields the solid line curve 52 in FIG. 5. I.e. it can be advantageous to introduce a silica ring between the passive power carrying core and the gain material in this single mode design.

EXAMPLE 3

In this example the amplifier waveguide of this invention is designed into a system comprising a master oscillator and two consecutive power amplifier sections (MOPA-PA2). The master oscillator and first power amplifier is established in a first fiber with a first signal to active material overlap and the second power amplifier is established in a second fiber with a second signal to active material overlap. Part of the entire core of the MOPA comprises Ge co-doped material such that a high reflectivity Bragg grating and an output coupler Bragg grating can define the master oscillator in a first part of the fibre section and the final part comprises the first power amplifier. Part of the core material of the second power amplifier section comprises aluminium such that the phonon guidance of the core is reduced with an increased threshold for stimulated Raman scattering as result.

The active material is identical in all parts of the MOPA-PA2 in that the same rare earth concentration is maintained all through the fibre lengths. The cross sectional region of the active material in the first MOPA is larger than the cross sectional region of the active material in the second power amplifier PA2. The signal overlap in the first MOPA section is higher than in the power amplifier PA2 due to the change in active material cross sectional region whereas the mode field diameter of the guided signal remains unchanged. This design show higher pump absorption in the MOPA relative to the PA2 which is beneficial to reducing photo darkening in co-propagating and/or couter-propagating pump configurations.

Figure 6:
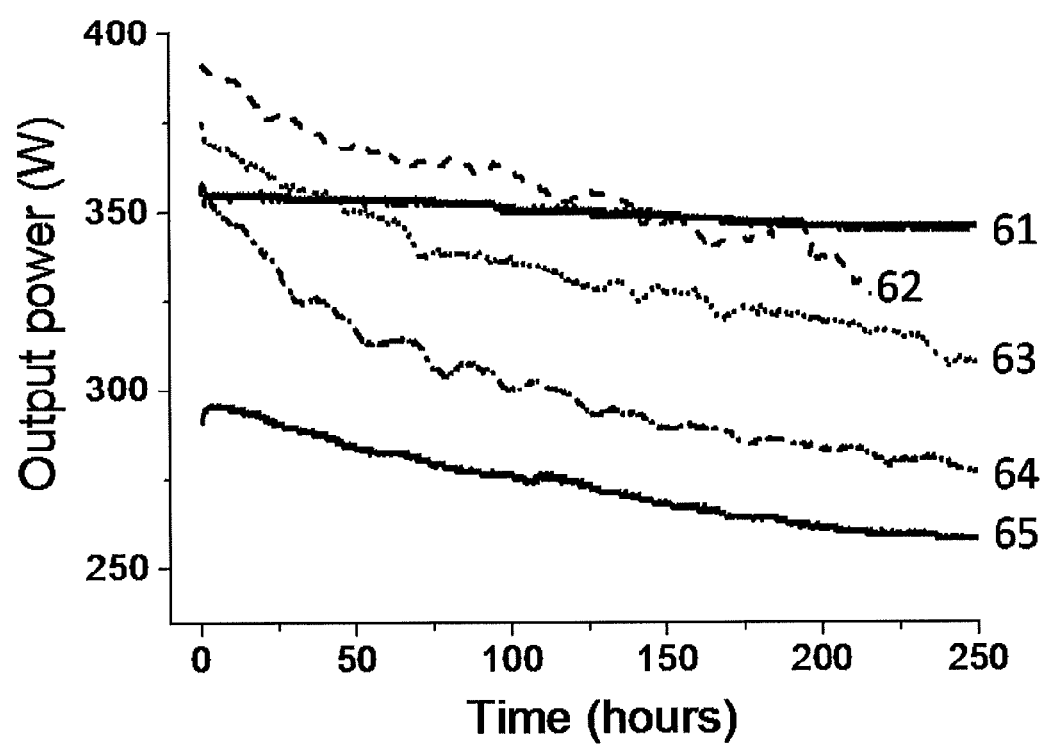
FIG. 6 shows slope efficiency of several high power single mode lasers

FIG. 6 shows reliability test curves for several prior art amplifier waveguides 62-65 and an amplifier waveguide according to the present invention 61. A constant input power is launched into the fiber and the output power is measured as a function of time. Clearly the amplifier waveguide according to the present invention provides the most stable output power and hence slope efficiency of the fiber. Both prior art amplifier waveguides 62-65 and an amplifier waveguide according to the present invention 61 hold nanostructure core designs where the rare earth material is embedded in fluorine co-doped silica resulting in 0.7-0.9 dB/m pump absorption (at 915 nm) for a 250 µm air clad pump core. For the waveguides 62 and 63, the local ytterbium concentration of the nanostructure is 0.22 at % Yb co-doped with 1.18 at % Aluminum, whereas the waveguides 64 and 65 show 0.14 at % Yb co-doped with 0.6 at % Al. The major difference between these systems is the signal to active material overlap where waveguides 62, 63, 64 and 65 show 29%, 30%, 44% and 43% overlap. The waveguide according to the present invention 61 hold 13% signal to active material overlap. The guided single mode field diameters are 19.4 µm, 18.1 µm, 18.0 µm and 18.0 µm for waveguides 62, 63, 64 and 65, respectively. The guided single mode field diameter is 19.0 µm for the amplifier waveguide according to the present invention 61.

EXAMPLE 4

Figure 7:
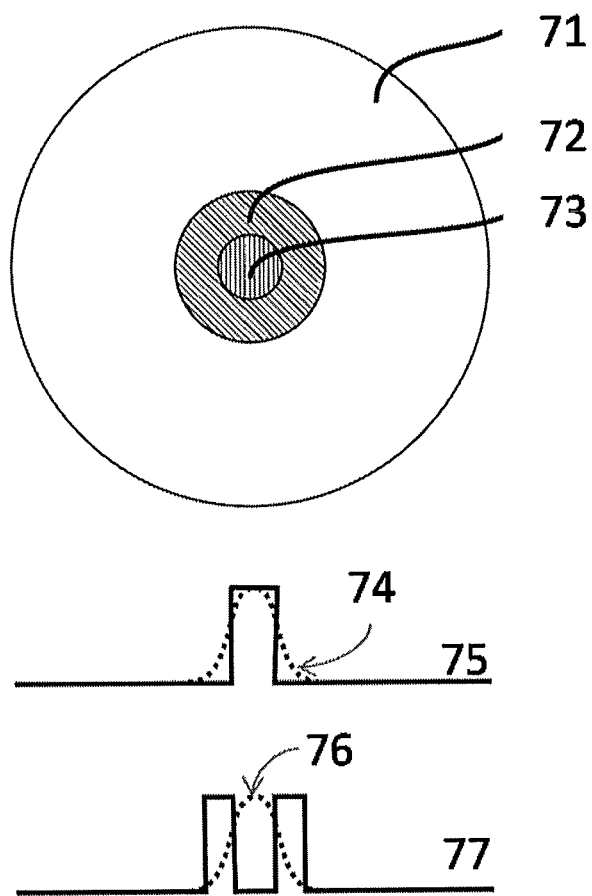
FIG. 7 shows a cross sectional view of a fiber comprising a doped inner cladding region.

FIG. 7 shows a diagram of a fiber comprising a passive signal core 73, an active rare earth doped first inner cladding 72, and second inner cladding 71. The passive core is Germanium doped to raise the refractive index of the core material, and the waveguide is formed by the index difference between the germanium doped signal core 73 and the inner cladding 71, 72. Only the signal guiding structure and the cladding is shown. A multimode pump cladding can be added using low index polymers, doped glass or an airclad. The rare earth doped first inner cladding 72 contributes to the pump light absorption when the fiber is used in an amplifier or laser configuration and it provides gain to the optical field confined by the high index regions. The signal mode to rare earth element overlap is below 25% percent, and consequently, the effect of photodarkening is mitigated compared to fibers with rare earth elements in the signal core. The index profile 75 and a rare earth doping profile 77 for a fiber, where the RE doped first inner cladding is index matched to the second inner cladding is also seen in FIG. 7. The fiber comprises a signal core 73, 74 surrounded by a first inner cladding 72. The index difference of a possible multimode pump cladding is not shown. As illustrated in FIG. 7, the mode profile 74, 76 of a guided optical signal has a reduced overlap to the rare earth elements in said first inner cladding.

EXAMPLE 5

Figure 8:
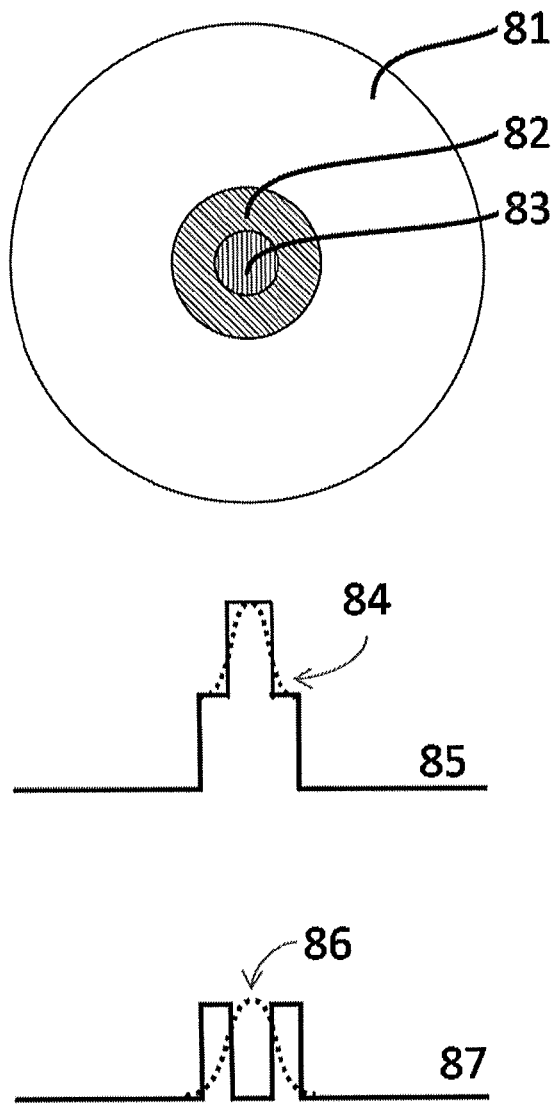
FIG. 8 shows a cross sectional view of a fiber comprising a doped inner cladding region

FIG. 8 shows a diagram of a fiber having a signal core 83, surrounded by a first inner cladding region 82 and an outer cladding 81, where the first inner cladding region 82 is not index matched with the outer cladding 81. The refractive index profile of this fiber 85 is such that the E-field distribution 84 is relatively strongly confined to the signal core/first inner cladding region. There is a reduced overlap between the rare earth element doping profile 87 and the E-field distribution 86. The degree of reduction of the overlap is limited by the ability of the signal light to saturate the gain in the gain media. A too low signal load on a particular part of the gain media will lead to temporal instability of an otherwise continuous signal output. In the designs of example 1 and example 2, the outer border of the gain material is chosen where the electrical field strength is ¹/₁₀ of its maximum value. An exact low limit has not been determined. The amplification provided by the Rare earth elements must exceed the loss incurred by e.g. transmission losses in the fibers. In practical embodiments, the overlap should probably not be below 1 percent.

EXAMPLE 6

Figure 9:
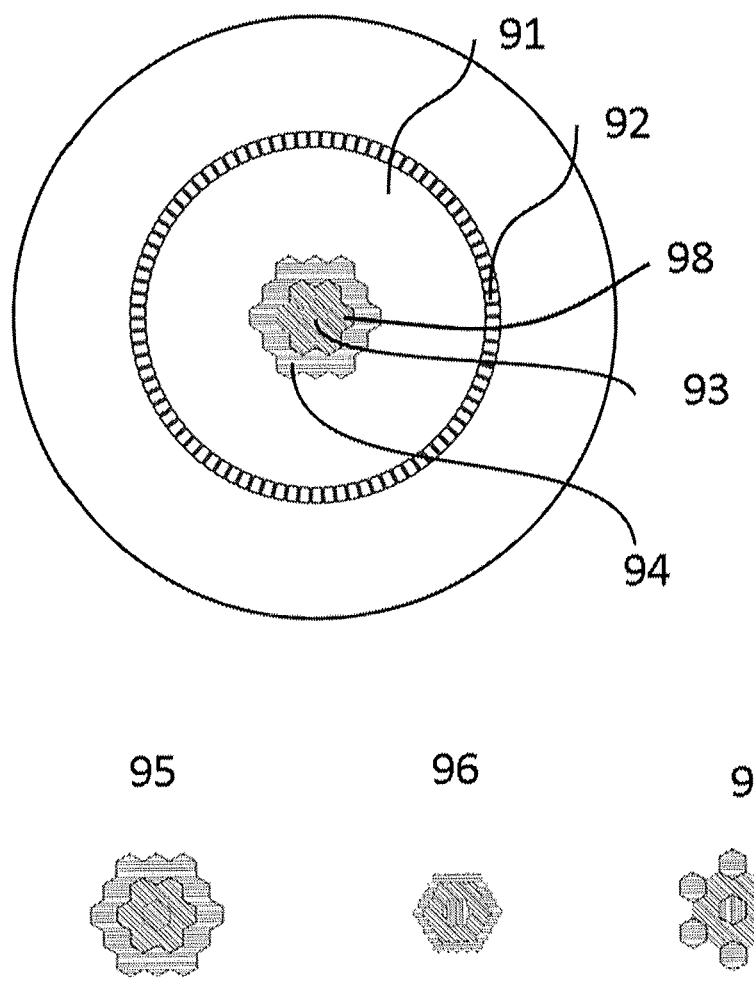
FIG. 9 shows a cross sectional view of a cross sectional segmented fiber according to the present invention.

FIG. 9 shows an example of an optical fiber according to the present invention, comprising a cross sectional segmented signal core. The signal core comprises a photo sensitive region 93 for Bragg grating formation, which is essentially free of active elements, such as Yb ions. The photo sensitive region 93 is surrounded by a passive region 98. These two core regions form the high index waveguiding part of the step-index signal core. The first inner cladding comprises a rare-earth doped region 94 surrounding the signal core and a passive second inner cladding 91 with the same or similar index as the first inner cladding. An air-clad 92 defines the perimeter of a pump cladding comprising the first and the second inner claddings. The index of the different doped regions is controlled by cross sectional segmenting of the regions. And the signal core geometry is formed by the stack and draw technique.

EXAMPLE 7

Figure 10:
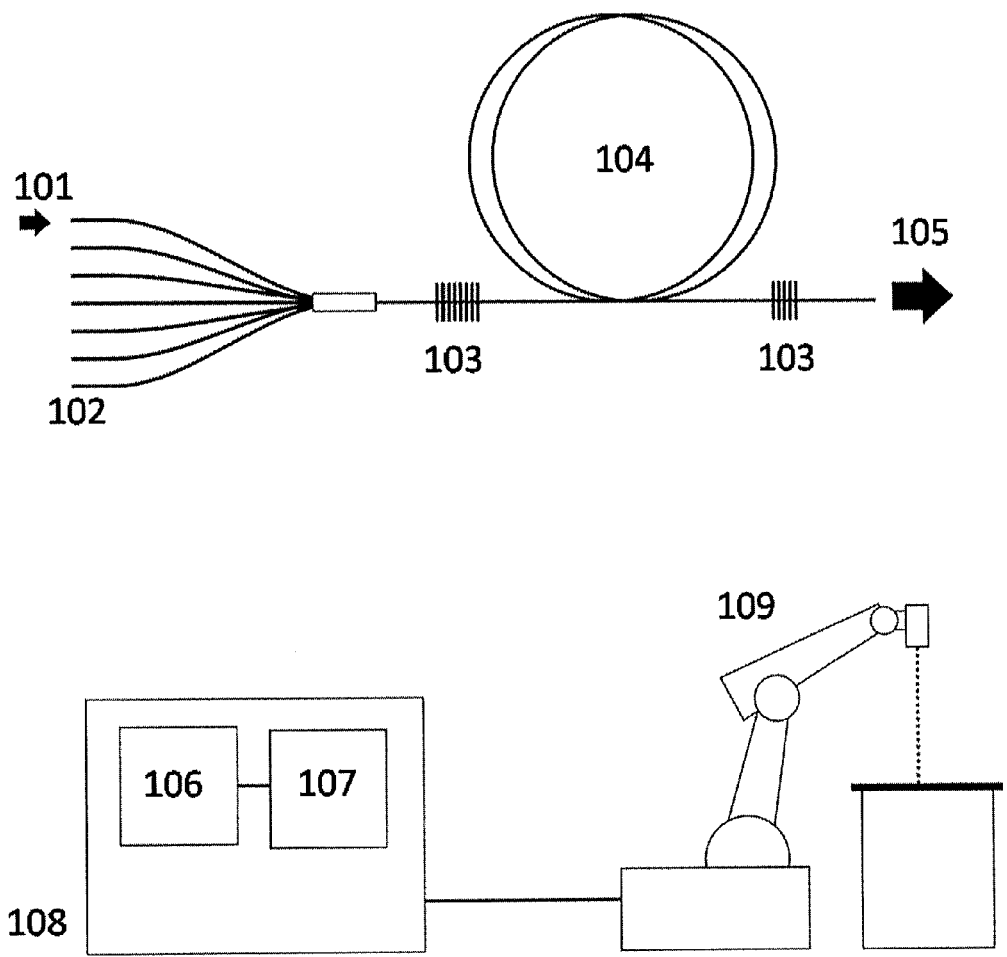
FIG. 10 shows a diagram of the high power amplifier according to the present invention in a laser configuration and a diagram of a possible application using a fiber laser based on a fiber according to the present invention.

A cladding pumped fiber according to the present invention may be used in relation to a material processing. A system 109 utilizing this is illustrated in FIG. 10, wherein a fiber laser module 108 comprises a pump module 106 and a fiber laser cavity 107. The laser beam from the cladding pumped fiber is subsequently provided to the material under treatment by the material processing system 109. In one configuration, the pump signal 101 from the pump module is provided thought a number of pump fibers 102 coupled into one fiber in an optical N×1 coupler, and the fiber laser cavity comprises two Bragg gratings 103 and an active fiber 105. The laser output 106 is then provided to the material.

EXAMPLE 8

Figure 11:
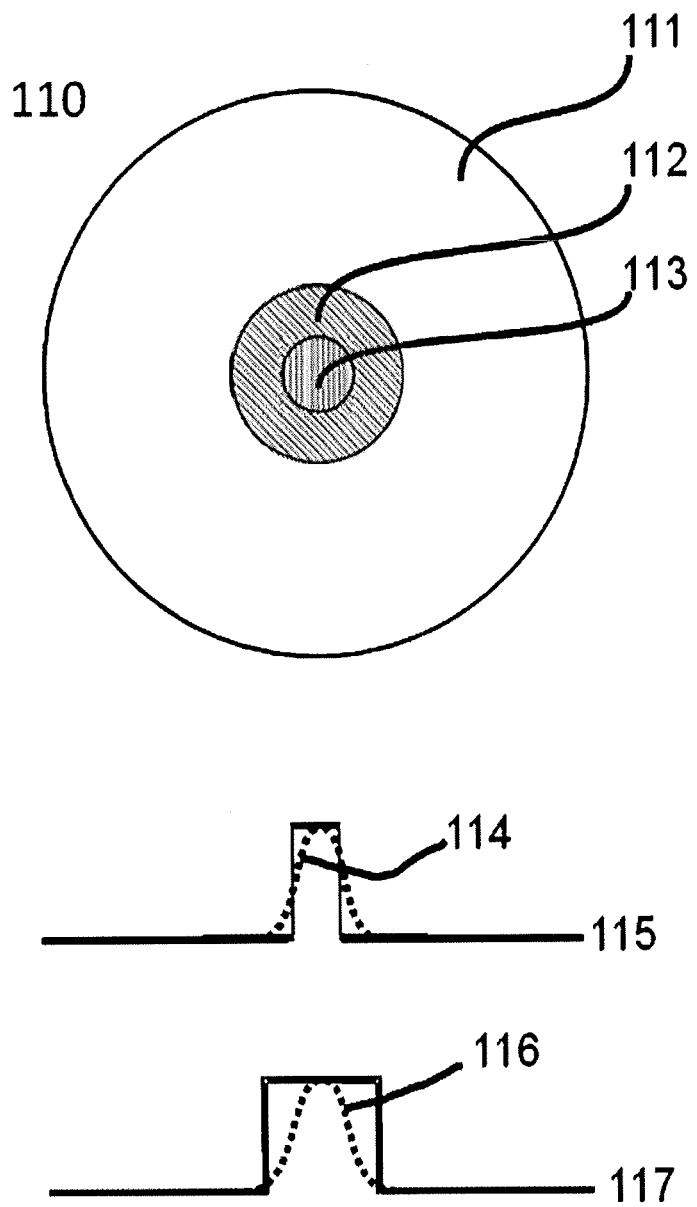
FIG. 11 shows a cross sectional view of a fiber comprising a RE doped signal core, a RE doped cladding and second cladding, and an example of an index profile and a RE doping profile for a fiber, where the doped cladding region is index matched to the cladding region.

FIG. 11 shows a diagram of a fiber 110 comprising a doped signal core 113, a doped first inner cladding 112 and second inner cladding 111. The waveguide is formed by the index difference between the doped signal core and the inner cladding. Only the signal guiding structure and the inner cladding is shown. A multimode pump cladding can be defined using low index polymers, doped glass or an airclad. The doped first inner cladding 112 contributes to the pump light absorption when the fiber is used in an amplifier or laser configuration and it provides gain to the optical field confined by the high index regions. Consequently, the pump absorption in a fiber designed according to the present invention will feature higher pump absorption for a given doping level than a fiber with the same core size without doped cladding features. Likewise, for a given pump absorption, a fiber designed according to the present invention can have a lower doping concentration in the signal core compared to a fiber with the same signal core size without RE doped inner cladding. FIG. 11 further shows an example of an index profile 115 and a doping profile 117 for a fiber, where the RE doped first inner cladding region 112 is index matched to the second inner cladding 111. The index difference of a possible multimode pump cladding is not shown. The mode profile 114, 116 of a guided optical signal is also illustrated in FIG. 11.

EXAMPLE 9

Figure 12:
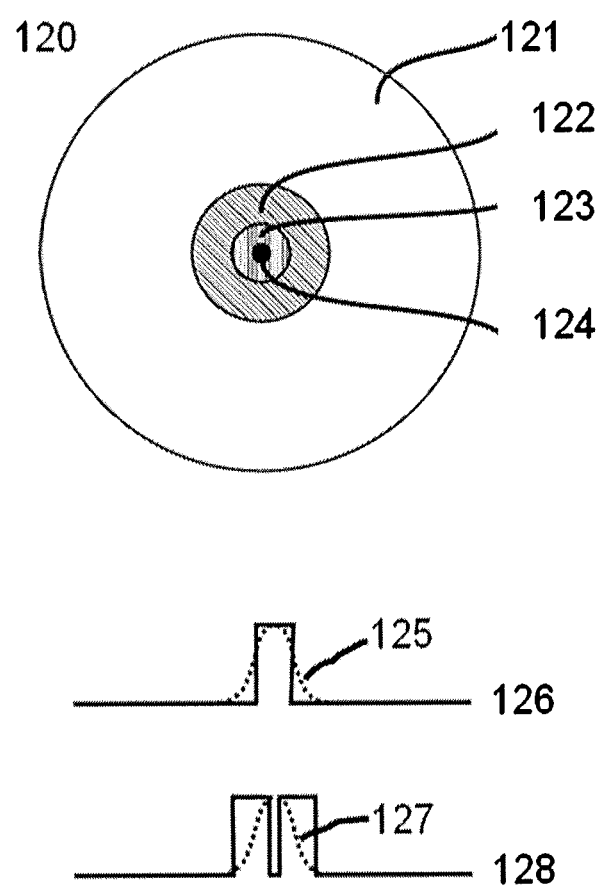
FIG. 12 shows a cross sectional view of a fiber, wherein the signal core comprises a central signal core region and a rare-earth (RE) doped signal core region, a rare-earth doped first inner cladding and second inner cladding; and an example of an index profile and a doping profile for a fiber, where the rare-earth (RE) doped first inner cladding is index matched to the second inner cladding.

FIG. 12 shows an example of an optical fiber 120 comprising a central signal core region 124, a rare-earth (RE) doped signal core region 123, a rare-earth doped first inner cladding 122 and second inner cladding 121. The central signal core region 124 can be used to add extra functionality to the fiber such as photo sensitivity making the fiber suitable for Bragg grating formation. FIG. 12 further shows examples of a possible index profile 126 and rare earth doping profile 128 for a fiber 120 with a central signal core region 124 and a rare-earth (RE) doped signal core region 123. In this example, the central signal core region is not doped with rare earth material. The mode profile 125, 127 of a guided optical signal is also illustrated in FIG. 12.

EXAMPLE 10

This example discloses how the concentration of rare earth atoms, such as Ytterbium, in a double clad optical fiber 130 comprising a silica glass host material can be reduced while keeping the pump light absorption constant in an amplifier or laser configuration. By using the core design principles of the present invention, three different core design examples 136, 137, and 138 are disclosed. The basis configuration for an optical fiber 130 comprising these designs is also seen illustrated in FIG. 13, where an active signal core is centered in a pump cladding surrounded by an air clad 132. The signal core comprises a photosensitive region 133 for Bragg grating formation, in which no Yb ions are doped. The photosensitive region 133 is surrounded by a Yb doped region 134 with similar refractive index. These two core regions form the high index waveguiding part of the step-index signal core. The signal core is surrounded by an Yb doped first inner cladding 135 with the same or similar index as the undoped second inner cladding 131. This doped first inner cladding 135 contributes to the gain in the fiber in an amplifier or laser configuration and it absorbs the pump light in the same way as the core material. The index of the different doped regions is controlled by cross sectional segmenting the regions. The core geometry is formed by the stack and draw technique.

The three different waveguide designs 136, 137, and 138 are disclosed in this example. The basic construction is the same for the three signal cores, but the area of the first inner cladding 135 index matched Yb doped material varies. In the table below, the key parameters of three different fibers using the three different waveguide designs are listed together with a fiber with no doped cladding region. All fibers has a core area of 177 µm$^2$, corresponding to a 15 µm diameter core. The pump cladding is 248 µm. The doped cladding area is 480, 258 and 278 µm$^2$, respectively. All fibers have pump absorption of 0.6 dB/m at 915 nm.

|  | Example 1 | Example 2 | Example 3 | Standard fiber | |
|---|---|---|---|---|---|
| Signal core diameter: | 15 | 15 | 15 | 15 | µm |
| Signal core area | 177 | 177 | 177 | 177 | µm2 |
| First inner cladding area | 480 | 291 | 303 | — | µm2 |
| Total area of RE-doped silica | 454 | 258 | 278 | 151 | µm2 |

|  | Example 1 | Example 2 | Example 3 | Standard fiber | |
|---|---|---|---|---|---|
| IC | 248 | 248 | 248 | 248 | µm |
| Fiber absorption | 0.6 | 0.6 | 0.6 | 0.6 | dB/m @ 915 nm |
| Needed bulk glass absorption | 64 | 112 | 104 | 191 | dB/m @ 915 nm |
| Yb Ion concentration | 1.05E20 | 1.85E20 | 1.72E20 | 3.2E20 | 1/cm$^3$ |

A fiber with a design as in Example 10 effectively reduces the rare earth doping concentration in the signal core by a factor of three, while maintaining the same pump light absorption compared to the standard design. Reduced rare earth doping concentration in the signal core results in reduced photodarkening.

The size of the doped first inner cladding, where the mode overlap is low, is limited by the ability of the signal light to saturate the gain in the gain media. A too low signal load on a particular part of the gain media will lead to temporal instability of an otherwise continuous signal output. An exact low limit has not been determined.

For high-power amplifier applications (both pulsed and CW), there is a general interest in fibers with high nonlinear threshold. An important parameter for the threshold is the fiber amplifier length, where a short fiber length means increased nonlinear threshold. The present invention provides means for reducing the fiber length compared to existing cladding-pumped optical fibers. Next, an example of a cladding-pumped fiber with very high pump absorption is presented. A high pump-absorption means a short fiber amplifier length.

EXAMPLE 11

Rod-type fibers are known, see for example Schmidt et al., "Single-polarization ultra-large-mode-area Yb-doped photonic crystal fiber," Opt. Express 16, pp. 3918-3923 (2008). In one embodiment of the present invention, a rod-type fiber is provided, where the cladding comprises a rare-earth doped region. The rare-earth doped region can be a solid and/or a holey region of the cladding. As an example, a rod-type fiber with a core comprising around 19 cells (this reflects the number of stack elements at the stacked preform production level), surrounded by an around 18 cell ring of cladding material with index matched to the cladding (for example, Yb doped cladding material). As an example, the increase in pump absorption will then be a factor of 1.95 (1+18/19). Hence, in comparison with existing rod fibers with 30 dB/m absorption at 976 nm (e.g. the Crystal Fibre DC-200/70-PM-Yb-ROD), the present invention allows around a doubling of the absorption (around 58 dB/m at 976 nm). Alternatively, in comparison, the present invention allows reduction of Yb concentration to around half the value for a given pump absorption. This is an advantage with respect to mitigation of photo-darkening.

EXAMPLE 12

In FIG. 14 is illustrated a cross sectional view of a fiber design 140 comprising a RE-doped signal core 143, a RE-doped first inner cladding 142 and a second inner cladding 141, where the RE-doped inner cladding is raised compared to the second inner cladding in a so-called pedestal design. The index profile 145 shows the pedestal design with the central signal core having a refractive index above that of the RE-doped inner cladding 142, which is surrounded by a second inner cladding having an even lower refractive index. In this example, the active material doping profile 147 has an essential constant level throughout the signal core and the RE doped first inner cladding. The mode profile 144, 146 of a guided optical signal is also illustrated in FIG. 14

The invention is broadly applicable to various dopants and types of doped fiber. Suitable dopants include, but are not limited to: Er, Yb, Nd, Tm, Ho, Pr, Sm, and Bi. Suitable doped fiber types include, but are not limited to: silica fiber, phosphate fiber, fluoride fiber, chalcogenide fiber, telluride fiber, polarization maintaining fiber, standard single-mode fiber, large-mode-area fiber, double-clad fiber, and holey fiber. Holey fiber is also known as photonic-crystal fiber, and has a transverse cross section designed to modify the photonic band structure of the fiber, typically by introducing structural periodicity at the wavelength or sub-wavelength scale.

Although the preceding examples relate to fiber gain media, the invention is applicable to any waveguide gain medium. Suitable waveguide gain media include but are not limited to: optical fibers, cladding-pumped fibers, integrated-optic waveguides, photonic-bandgap waveguides, circular cross-section waveguides, rectangular cross-section waveguides, and waveguides having arbitrary transverse cross sections. Thus, in broad terms, the invention relates to a waveguide gain module having two waveguide sections disposed in series, with one waveguide section having higher dopant concentration and lower optical intensity than the other waveguide section. Any number of waveguide sections can be included in this manner, as can a continuous variation of dopant concentration.

The invention is applicable to lasers, amplifiers, and optical sources in general (e.g., ASE sources), as well as to any other device utilizing a waveguide doped with an ion susceptible to photodarkening. Any such device can include a waveguide gain module as described above Aspects of the cross sectional segmented regions/areas as well as their manufacture are described in U.S. Pat. No. 7,116,875 and in WO 27107164 that are both incorporated herein by reference.

Aspects of rare-earth doped silica fibre lasers are described in a variety of sources, e.g. in [Digonnet], chapter 3, pp. 113-170.

Aspects of writing of Bragg gratings in optical fibres and hydrogen/deuterium loading in silica optical fibres are discussed in various text books in connection with photosensitivity enhancements prior or during the writing of Bragg gratings in optical fibres, cf. e.g. A. Othonos & K. Kalli in 'Fibre Bragg Gratings', Artech House, 1999, chapter 2.6.1, pp. 43-48.

The invention claimed is:

1. A high power amplifier waveguide system for amplifying an optical signal comprising:
   a) a diode bar array pump laser which operates at a wavelength $\lambda_{pump}$ and with a pump power exceeding 100 W;
   b) a coupling device;
   c) a cladding pumped amplifier waveguide;
   d) an output delivery fibre;
   the cladding pumped amplifier waveguide comprising
   a signal core adapted to guide an optical signal at a signal wavelength, $\lambda_{signal}$, the signal core having an effective refractive index $n_{core-1}$, wherein the signal core comprises at least one photosensitive region comprising at least one photosensitive element, wherein the photosensitive element is selected from the group of Germanium (Ge), Boron (B), or combinations thereof;
   an inner cladding region for guiding pump light, the inner cladding region comprising a first inner cladding surrounding the signal core and having an effective refractive index $n_{inner-clad-1}$, the first inner cladding comprising a material doped with at least one rare earth element, the rare earth element being Ytterbium (Yb) and the first inner cladding material is down-doped with an index lowering element selected from the group of Fluorine (F), Boron (B), or combinations thereof, wherein said first inner cladding comprises at least one rare earth doped silica region;
   where the wavelength $\lambda_{pump}$ is resonant with an absorption band of the rare earth element, where $n_{core-1} > n_{inner-clad-1}$, and where an area of the signal core is larger than 50 μm$^2$, wherein the signal wavelength, $\lambda_{signal}$, of the optical signal is within the interval from 1050 nm to 1090 nm; and
   wherein an overlap of the optical signal to the at least one rare earth doped silica region is less than or equal to 25%.

2. The system according to claim 1, wherein the high power amplifier waveguide system is a waveguide laser system.

3. The system according to claim 2, wherein between the coupling device and the cladding pumped amplifier waveguide is formed a first fibre Bragg grating, and wherein between the cladding pumped amplifier waveguide and the output delivery fibre is formed a second fibre Bragg grating.

4. The system according to claim 3, wherein the Bragg gratings are written directly into the amplifier waveguide.

5. The system according to claim 1, the waveguide further comprising an outer cladding region surrounding the inner cladding region, the outer cladding region comprising at least a first outer cladding having an effective refractive index $n_{outer-clad-1}$.

6. The system according to claim 1, wherein at least part of the rare earth doped silica regions are surrounded by down-doped silica regions, and wherein $n_{inner-clad-1}$ is given by the average refractive index of the rare earth doped silica regions and the down-doped silica regions.

7. The system according to claim 1, wherein the inner cladding region further includes a second inner cladding having an effective refractive index $n_{inner-cladding-2}$ and wherein $n_{inner-clad-1} - n_{inner-clad-2}$ is less than $1 \cdot 10^{-3}$.

8. The system according to claim 1, wherein the effective mode area of the optical signal is larger than 50 μm$^2$.

9. The system according to claim 1, where an overlap of the optical signal to the rare earth doped silica region(s) is 25%.

10. The system according to claim 1, wherein the area of the first inner cladding is larger than about 100 μm$^2$.

11. The system according to claim 1, wherein the ratio between the area of the first inner cladding and the area of the signal core is in the range of about 4 to about 500.

12. The system according to claim 1, wherein the mode field intensity of the optical signal in the inner cladding region is in the range of about 0.5% to 5%.

13. The system according to claim 1, wherein the inner cladding features comprise regions with refractive index below that of the first and/or second inner cladding background material, such as voids.

14. The system according to claim 5, wherein the outer cladding region comprises a polymer coating.

15. A method for fabricating a cladding pumped amplifier waveguide for use in the high power amplifier waveguide system according to claim 1, comprising arranging precursor elements in a preform and drawing the preform into an amplifier waveguide.

* * * * *